US008650507B2

(12) United States Patent
Westerman et al.

(10) Patent No.: US 8,650,507 B2
(45) Date of Patent: Feb. 11, 2014

(54) SELECTING OF TEXT USING GESTURES

(75) Inventors: Wayne Carl Westerman, San Francisco, CA (US); Bas Ording, San Francisco, CA (US); B. Michael Victor, Menlo Park, CA (US); Stephen O. Lemay, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 879 days.

(21) Appl. No.: 12/042,313

(22) Filed: Mar. 4, 2008

(65) Prior Publication Data
US 2009/0228842 A1    Sep. 10, 2009

(51) Int. Cl.
*G06F 3/033* (2013.01)
(52) U.S. Cl.
USPC .......................................................... 715/863
(58) Field of Classification Search
USPC .......................................................... 715/863
See application file for complete search history.

(56) References Cited

U.S. PATENT DOCUMENTS

| | | | |
|---|---|---|---|
| 4,332,464 A | 6/1982 | Bartulis et al. | 355/14 |
| 4,680,429 A | 7/1987 | Murdock et al. | 178/19 |
| 4,698,625 A | 10/1987 | McCaskill et al. | 340/709 |
| 4,755,811 A | 7/1988 | Slavin et al. | 340/731 |
| 4,790,028 A | 12/1988 | Ramage | 382/47 |
| 5,016,002 A | 5/1991 | Levanto | 340/756 |
| 5,027,110 A | 6/1991 | Chang et al. | 340/731 |
| 5,053,758 A | 10/1991 | Cornett et al. | 340/712 |
| 5,079,723 A | 1/1992 | Herceg et al. | 395/156 |
| 5,119,079 A | 6/1992 | Hube et al. | 340/712 |
| 5,201,034 A | 4/1993 | Matsuura et al. | 395/155 |
| 5,260,697 A | 11/1993 | Barrett et al. | 345/173 |
| 5,266,931 A | 11/1993 | Tanaka | 345/173 |
| 5,266,949 A | 11/1993 | Rossi | 341/22 |
| 5,319,386 A | 6/1994 | Gunn et al. | 345/173 |
| 5,326,270 A | 7/1994 | Ostby et al. | 434/362 |
| 5,335,276 A | 8/1994 | Thompson et al. | 380/21 |
| 5,341,293 A | 8/1994 | Vertelney et al. | 364/419.17 |
| 5,341,466 A | 8/1994 | Perlin et al. | 395/139 |
| 5,347,295 A | 9/1994 | Agulnick et al. | |

(Continued)

FOREIGN PATENT DOCUMENTS

| | | | | |
|---|---|---|---|---|
| EP | 0 283 995 A2 | 9/1988 | | G06F 3/023 |
| EP | 0 476 972 A2 | 3/1992 | | G03G 15/00 |

(Continued)

OTHER PUBLICATIONS

"How Would You Like Selection/Copy/Paste to Work?", MAC Forums, http://forums.macrumors.com/showthread.php?p=3932833#post3932833.

(Continued)

*Primary Examiner* — Sara England
(74) *Attorney, Agent, or Firm* — Morgan, Lewis & Bockius LLP

(57) ABSTRACT

In accordance with some embodiments, a computer-implemented text selection method is performed using an electronic device having a touch-sensitive display. The method can include displaying text on the touch screen display; detecting a text selection initiation gesture with the touch screen display; and in response to the text selection initiation gesture, inserting a text selection area bounded by a first endpoint located in the text at a first location and a second endpoint in the text at a second location. First and second endpoints can be moved by performing further gestures on the touch-sensitive display. Furthermore, word processing functions can be performed on the on the text located in the text selection area.

28 Claims, 21 Drawing Sheets

(56) References Cited

U.S. PATENT DOCUMENTS

| | | | |
|---|---|---|---|
| 5,367,453 A | 11/1994 | Capps et al. | |
| 5,408,060 A | 4/1995 | Muurinen | 200/314 |
| 5,422,656 A | 6/1995 | Allard et al. | 345/173 |
| 5,459,488 A | 10/1995 | Geiser | 345/173 |
| 5,463,725 A | 10/1995 | Henckel et al. | 395/155 |
| 5,465,401 A | 11/1995 | Thompson | 455/89 |
| 5,483,261 A | 1/1996 | Yasutake | |
| 5,488,204 A | 1/1996 | Mead et al. | |
| 5,511,148 A * | 4/1996 | Wellner | 358/1.6 |
| 5,523,775 A | 6/1996 | Capps | |
| 5,543,588 A | 8/1996 | Bisset et al. | 178/18 |
| 5,543,897 A | 8/1996 | Altrieth, III | 355/209 |
| 5,553,225 A | 9/1996 | Perry | |
| 5,565,888 A | 10/1996 | Selker | 345/146 |
| 5,568,536 A | 10/1996 | Tiller et al. | 379/58 |
| 5,579,037 A | 11/1996 | Tahara et al. | 345/173 |
| 5,589,856 A | 12/1996 | Stein et al. | 345/173 |
| 5,615,384 A | 3/1997 | Allard et al. | 395/800 |
| 5,638,523 A | 6/1997 | Mullet et al. | 395/326 |
| 5,710,831 A | 1/1998 | Beernink et al. | |
| 5,721,939 A * | 2/1998 | Kaplan | 704/9 |
| 5,736,974 A | 4/1998 | Selker | 345/146 |
| 5,754,873 A | 5/1998 | Nolan | 395/789 |
| 5,757,358 A | 5/1998 | Osga | 345/146 |
| 5,760,773 A | 6/1998 | Berman et al. | 345/347 |
| 5,778,404 A | 7/1998 | Capps et al. | |
| 5,815,142 A | 9/1998 | Allard et al. | 345/173 |
| 5,825,352 A | 10/1998 | Bisset et al. | |
| 5,835,079 A | 11/1998 | Shieh | |
| 5,877,751 A | 3/1999 | Kanemitsu et al. | 345/173 |
| 5,880,411 A | 3/1999 | Gillespie et al. | |
| 5,910,800 A | 6/1999 | Shields et al. | 345/336 |
| 5,910,801 A | 6/1999 | Rosenburg et al. | |
| 5,926,769 A | 7/1999 | Valimaa et al. | 455/564 |
| 5,943,043 A | 8/1999 | Furuhata et al. | 345/173 |
| 5,956,021 A | 9/1999 | Kubota et al. | 345/179 |
| 5,967,996 A * | 10/1999 | Kadota et al. | 600/544 |
| 5,977,950 A | 11/1999 | Rhyne | 345/145 |
| 5,982,352 A | 11/1999 | Pryor | 345/156 |
| 6,020,881 A | 2/2000 | Naughton et al. | 345/327 |
| 6,037,939 A | 3/2000 | Kashiwagi et al. | 345/342 |
| 6,049,326 A | 4/2000 | Beyda et al. | 345/157 |
| 6,054,990 A | 4/2000 | Tran | 345/358 |
| 6,073,036 A | 6/2000 | Heikkinen et al. | 455/575 |
| 6,121,960 A | 9/2000 | Carroll et al. | 345/173 |
| 6,157,935 A | 12/2000 | Tran et al. | 707/503 |
| 6,173,194 B1 | 1/2001 | Vanttila | 455/566 |
| 6,188,391 B1 | 2/2001 | Seely et al. | |
| 6,262,735 B1 | 7/2001 | Etelapera et al. | |
| 6,295,390 B1 | 9/2001 | Kobayashi et al. | 382/313 |
| 6,310,610 B1 | 10/2001 | Beaton et al. | |
| 6,323,846 B1 | 11/2001 | Westerman et al. | |
| 6,411,283 B1 | 6/2002 | Murphy | 345/173 |
| 6,525,749 B1 | 2/2003 | Moran et al. | 345/863 |
| 6,563,913 B1 | 5/2003 | Kaghazian | |
| 6,570,557 B1 | 5/2003 | Westerman et al. | |
| 6,643,824 B1 | 11/2003 | Bates et al. | |
| 6,664,989 B1 | 12/2003 | Snyder et al. | 345/856 |
| 6,664,991 B1 | 12/2003 | Chew et al. | |
| 6,677,932 B1 | 1/2004 | Westerman | |
| 6,690,387 B2 | 2/2004 | Zimmerman et al. | |
| 6,822,635 B2 | 11/2004 | Shahoian et al. | |
| 6,850,220 B2 | 2/2005 | Sakaguchi | |
| 6,888,536 B2 | 5/2005 | Westerman et al. | |
| 6,938,222 B2 * | 8/2005 | Hullender et al. | 715/863 |
| 6,971,068 B2 | 11/2005 | Bates et al. | |
| 7,015,894 B2 | 3/2006 | Morohoshi | |
| 7,030,861 B1 | 4/2006 | Westerman et al. | |
| 7,047,503 B1 | 5/2006 | Parrish et al. | 715/863 |
| 7,075,512 B1 | 7/2006 | Fabre et al. | 345/156 |
| 7,084,859 B1 | 8/2006 | Pryor | |
| 7,088,344 B2 | 8/2006 | Maezawa et al. | |
| 7,123,243 B2 | 10/2006 | Kawasaki et al. | |
| 7,184,064 B2 | 2/2007 | Zimmerman et al. | |
| 7,213,214 B2 | 5/2007 | Baar et al | |
| 7,218,226 B2 | 5/2007 | Wehrenberg | |
| 7,268,772 B2 | 9/2007 | Kawai et al. | |
| 7,305,630 B2 * | 12/2007 | Hullender et al. | 715/863 |
| 7,479,949 B2 | 1/2009 | Jobs et al. | |
| 7,536,656 B2 * | 5/2009 | Hullender et al. | 715/863 |
| 7,565,613 B2 | 7/2009 | Forney | |
| 7,614,008 B2 | 11/2009 | Ording | |
| 7,633,076 B2 | 12/2009 | Huppi et al. | |
| 7,653,883 B2 | 1/2010 | Hotelling et al. | |
| 7,657,849 B2 | 2/2010 | Chaudhri et al. | |
| 7,663,607 B2 | 2/2010 | Hotelling et al. | |
| 7,683,889 B2 | 3/2010 | Rimas Ribikauskas et al. | |
| 7,705,830 B2 | 4/2010 | Westerman et al. | 345/173 |
| 7,743,348 B2 | 6/2010 | Robbins et al. | |
| 7,760,187 B2 | 7/2010 | Kennedy | 345/173 |
| 7,818,691 B2 | 10/2010 | Irvine | |
| 8,042,042 B2 | 10/2011 | Kim et al. | |
| 2001/0040587 A1 | 11/2001 | Scheck | 345/676 |
| 2002/0003469 A1 | 1/2002 | Gupta | |
| 2002/0011993 A1 | 1/2002 | Lui et al. | |
| 2002/0030665 A1 | 3/2002 | Ano | |
| 2002/0059350 A1 | 5/2002 | Iwema et al. | |
| 2002/0067346 A1 | 6/2002 | Mouton | 345/173 |
| 2002/0069220 A1 | 6/2002 | Tran | 707/503 |
| 2002/0080123 A1 | 6/2002 | Kennedy et al. | 345/173 |
| 2002/0080151 A1 | 6/2002 | Venolia | 345/660 |
| 2002/0097270 A1 | 7/2002 | Keely et al. | |
| 2002/0112180 A1 | 8/2002 | Land et al. | |
| 2002/0180763 A1 | 12/2002 | Kung | 345/660 |
| 2003/0014382 A1 | 1/2003 | Iwamoto et al. | 707/1 |
| 2003/0063073 A1 | 4/2003 | Geaghan et al. | 345/173 |
| 2003/0137522 A1 | 7/2003 | Kaasila et al. | |
| 2004/0039934 A1 | 2/2004 | Land et al. | |
| 2004/0075695 A1 | 4/2004 | Chew et al. | |
| 2004/0130575 A1 | 7/2004 | Tai et al. | |
| 2004/0135818 A1 | 7/2004 | Thomson et al. | 345/823 |
| 2004/0155888 A1 | 8/2004 | Padgitt et al. | 345/619 |
| 2004/0160419 A1 | 8/2004 | Padgitt | 345/173 |
| 2004/0174399 A1 | 9/2004 | Wu et al. | 345/863 |
| 2004/0183817 A1 | 9/2004 | Kaasila | |
| 2004/0196267 A1 | 10/2004 | Kawai et al. | 345/173 |
| 2004/0203674 A1 | 10/2004 | Shi et al. | 455/415 |
| 2004/0237053 A1 | 11/2004 | Impas et al. | |
| 2005/0005241 A1 | 1/2005 | Hunleth et al. | |
| 2005/0012723 A1 | 1/2005 | Pallakoff | |
| 2005/0024341 A1 | 2/2005 | Gillespie et al. | 345/173 |
| 2005/0052547 A1 | 3/2005 | Minakuti et al. | 348/224.1 |
| 2005/0068342 A1 | 3/2005 | Ouchi et al. | 345/684 |
| 2005/0076300 A1 | 4/2005 | Martinez | |
| 2005/0093826 A1 | 5/2005 | Huh | 345/168 |
| 2005/0111736 A1 * | 5/2005 | Hullender et al. | 382/188 |
| 2005/0135053 A1 | 6/2005 | Carroll | |
| 2005/0140660 A1 | 6/2005 | Valikangas | |
| 2005/0190147 A1 | 9/2005 | Kim | 345/156 |
| 2005/0192924 A1 * | 9/2005 | Drucker et al. | 707/1 |
| 2005/0229117 A1 * | 10/2005 | Hullender et al. | 715/863 |
| 2005/0243373 A1 | 11/2005 | Silverbrook et al. | |
| 2006/0001654 A1 | 1/2006 | Smits | 345/176 |
| 2006/0017692 A1 | 1/2006 | Wehrenberg et al. | |
| 2006/0022955 A1 | 2/2006 | Kennedy | 345/173 |
| 2006/0026521 A1 | 2/2006 | Hotelling et al. | |
| 2006/0026535 A1 | 2/2006 | Hotelling et al. | |
| 2006/0026536 A1 | 2/2006 | Hotelling et al. | 715/863 |
| 2006/0033724 A1 | 2/2006 | Chaudhri et al. | |
| 2006/0041589 A1 | 2/2006 | Helfman et al. | |
| 2006/0053387 A1 | 3/2006 | Ording | |
| 2006/0066588 A1 | 3/2006 | Lyon et al. | 345/173 |
| 2006/0085757 A1 | 4/2006 | Andre et al. | |
| 2006/0010354 A1 * | 5/2006 | Hashimoto et al. | 715/863 |
| 2006/0097991 A1 | 5/2006 | Hotelling et al. | |
| 2006/0125803 A1 | 6/2006 | Westerman et al. | |
| 2006/0132460 A1 | 6/2006 | Kolmykov-Zotov et al. | 345/173 |
| 2006/0197753 A1 | 9/2006 | Hotelling | |
| 2006/0238519 A1 | 10/2006 | Westerman et al. | |
| 2006/0242607 A1 | 10/2006 | Hudson | |
| 2006/0244735 A1 | 11/2006 | Wilson | 345/173 |
| 2006/0265648 A1 | 11/2006 | Rainisto et al. | |
| 2006/0265653 A1 | 11/2006 | Paasonen et al. | |
| 2006/0274051 A1 | 12/2006 | Longe et al. | 345/173 |

(56) References Cited

U.S. PATENT DOCUMENTS

| | | | |
|---|---|---|---|
| 2006/0277481 A1 | 12/2006 | Forstall et al. | |
| 2006/0284858 A1 | 12/2006 | Rekimoto | 345/173 |
| 2006/0290678 A1 | 12/2006 | Lii | |
| 2007/0033544 A1 | 2/2007 | Fleisher et al. | |
| 2007/0115264 A1 | 5/2007 | Yu et al. | |
| 2007/0139374 A1 | 6/2007 | Harley | 345/157 |
| 2007/0150842 A1 | 6/2007 | Chaudhri et al. | |
| 2007/0152978 A1 | 7/2007 | Kocienda et al. | |
| 2007/0152980 A1 | 7/2007 | Kocienda et al. | |
| 2007/0152984 A1 | 7/2007 | Ording et al. | |
| 2007/0157085 A1 | 7/2007 | Peters | |
| 2007/0238489 A1 | 10/2007 | Scott | |
| 2007/0247435 A1 | 10/2007 | Benko et al. | 345/173 |
| 2007/0250793 A1 | 10/2007 | Miura et al. | |
| 2007/0257890 A1 | 11/2007 | Hotelling et al. | |
| 2007/0260981 A1 | 11/2007 | Kim et al. | |
| 2008/0002888 A1 | 1/2008 | Yuan | 382/187 |
| 2008/0036743 A1* | 2/2008 | Westerman et al. | 345/173 |
| 2008/0055269 A1 | 3/2008 | Lemay et al. | |
| 2008/0055273 A1 | 3/2008 | Forstall | |
| 2008/0077880 A1 | 3/2008 | Oygard | |
| 2008/0094368 A1 | 4/2008 | Ording et al. | 345/173 |
| 2008/0098331 A1 | 4/2008 | Novick et al. | |
| 2008/0122796 A1 | 5/2008 | Jobs et al. | |
| 2008/0126387 A1 | 5/2008 | Blinnikka | 707/102 |
| 2008/0165142 A1 | 7/2008 | Kocienda et al. | 345/173 |
| 2008/0165143 A1 | 7/2008 | Tolmasky et al. | |
| 2008/0165160 A1 | 7/2008 | Kocienda et al. | 345/175 |
| 2008/0168349 A1 | 7/2008 | Lamiraux et al. | |
| 2008/0168388 A1 | 7/2008 | Decker | |
| 2008/0174570 A1 | 7/2008 | Jobs et al. | |
| 2008/0184138 A1 | 7/2008 | Krzanowski et al. | |
| 2008/0201452 A1 | 8/2008 | Athas et al. | |
| 2008/0259040 A1 | 10/2008 | Ording et al. | 345/173 |
| 2008/0270891 A1 | 10/2008 | Friedman et al. | |
| 2008/0294974 A1 | 11/2008 | Nurmi et al. | |
| 2008/0316183 A1 | 12/2008 | Westerman et al. | |
| 2008/0316212 A1 | 12/2008 | Kushler | |
| 2009/0093276 A1 | 4/2009 | Kim et al. | |
| 2009/0125848 A1 | 5/2009 | Keohane et al. | |
| 2009/0138810 A1 | 5/2009 | Howard et al. | |
| 2009/0153492 A1 | 6/2009 | Popp | |
| 2009/0167700 A1 | 7/2009 | Westerman et al. | |
| 2009/0225100 A1 | 9/2009 | Lee et al. | 345/660 |
| 2009/0228792 A1 | 9/2009 | van Os et al. | |
| 2009/0228841 A1 | 9/2009 | Hildreth | 715/863 |
| 2009/0235186 A1 | 9/2009 | Howard et al. | |
| 2010/0042933 A1 | 2/2010 | Ragusa | |
| 2010/0169766 A1 | 7/2010 | Duarte et al. | |
| 2010/0174979 A1 | 7/2010 | Mansfield et al. | |
| 2010/0174980 A1 | 7/2010 | Mansfield et al. | |
| 2010/0174985 A1 | 7/2010 | Levy et al. | |
| 2010/0202010 A1 | 8/2010 | Xiao | |
| 2010/0231529 A1 | 9/2010 | Tikka | |
| 2011/0258537 A1 | 10/2011 | Rives et al. | |

FOREIGN PATENT DOCUMENTS

| | | | | |
|---|---|---|---|---|
| EP | 0 575 146 A2 | 12/1993 | | G06F 3/033 |
| EP | 0 609 030 A1 | 8/1994 | | G06F 3/033 |
| EP | 0 651 543 A2 | 5/1995 | | H04M 1/00 |
| EP | 0 795 811 A1 | 9/1997 | | |
| EP | 1 850 217 A2 | 10/2007 | | |
| EP | 1 850 217 A3 | 10/2007 | | |
| FR | 2 898 197 A1 | 9/2007 | | |
| GB | 2 433 402 A | 6/2007 | | |
| JP | 57-041731 | 3/1982 | | G06F 3/033 |
| JP | 59-057336 | 4/1984 | | G06F 3/037 |
| JP | 02153415 A | 6/1990 | | G06F 3/02 |
| JP | 03113578 A | 5/1991 | | G06F 15/62 |
| JP | 05 165459 | 7/1993 | | G09G 5/36 |
| JP | 6274586 A | 9/1994 | | G06F 17/21 |
| JP | 6332617 A | 12/1994 | | G06F 3/02 |
| JP | 07320051 | 12/1995 | | G06T 3/40 |
| JP | 07320079 | 12/1995 | | G06T 11/80 |
| JP | 8185265 A | 7/1996 | | G06F 3/033 |
| JP | 8227341 A | 9/1996 | | G06F 3/033 |
| JP | 2000-163031 A | 6/2000 | | |
| JP | 2002-342033 A | 11/2002 | | |
| WO | WO 94/29788 A1 | 12/1994 | | G06F 3/033 |
| WO | WO 98/09270 A1 | 3/1998 | | G09G 5/00 |
| WO | WO 98/52118 A | 11/1998 | | |
| WO | WO 99/21084 A1 | 4/1999 | | |
| WO | WO 99/54807 A1 | 10/1999 | | |
| WO | WO-03/023593 A1 | 3/2003 | | |
| WO | WO 2006/020304 A2 | 2/2006 | | |
| WO | WO 2006/020305 A2 | 2/2006 | | |
| WO | WO 2006/126055 A2 | 11/2006 | | |
| WO | WO-2007/037806 A1 | 5/2007 | | |
| WO | WO 2008/030879 A3 | 3/2008 | | |
| WO | WO 2008/052100 A2 | 5/2008 | | |

OTHER PUBLICATIONS iPhone Copy and Paste video, You Tube, http://www.youtube.com/watch?v=UXgsQhiGeag.

"Quasi Clipboard", Apple Web Apps, http://www.apple.com/webapps/utilities/quasiclipboard.html.

Invitation to Pay Additional Fees mailed Jun. 9, 2009, for PCT Application No. PCT/US2009/035177, filed Feb. 25, 2009, six pages.

Bitstream®, "ThunderHawk Pocket PC Edition for End Users," 2005, 4 pages, http://www.bitstream.com/wireless/products/pocketpc/faq_using.html.

iPhone Hacks, "iCopy Brings Copy & Paste Feature to the iPhone," 2008, 3 pages, http://www.iphonehacks.com/2008/03/iphone-icopy.html.

iPhone Hacks, "iPhone App—MagicPad's Copy & Paste Feature," 2008, 2 pages, http://www.iphonehacks.com/2008/07/iphonecopypaste.html.

Lonelysandwich, "iPhone Copy/Paste Proof of Concept Video," Jan. 28, 2008, 1 page, http://babygotmac.com/a/iphone-copypaste-proof-of-concept-video/.

Miller, D., "Personal/Java Application Environment," Jun. 8, 1999, 12 pages, http://java.sun.com/products/personaljava/touchable/.

Mitchell, R. "GUI Gets a Makeover," Computerworld Software, 4 pages, Sep. 25, 2006, http://www.computerworld.com/action/article.do?command=printArticleBasic&articleId=263695.

Rekimoto, J. et al., "PreSense: Interaction Techniques for Finger Sensing Input Devices," UIST 2003, Vancouver, BC, Canada, © 2003 ACM, vol. 5, Issue 2, pp. 203-212.

Shen et al., "Informing the Design of Direct-Touch Tabletops," IEEE Sep./Oct. 2006, pp. 36-46.

Office Action dated Oct. 30, 2008, received in U.S. Appl. No. 11/553,436.

Office Action dated May 13, 2009, received in U.S. Appl. No. 11/553,436.

Office Action dated Oct. 30, 2009, received in U.S. Appl. No. 11/553,436.

Final Office Action dated Nov. 17, 2009, received in U.S. Appl. No. 10/927,925.

Notice of Allowance dated Mar. 15, 2010, received in U.S. Appl. No. 10/927,925.

Notice of Allowance dated Jan. 27, 2011, received in U.S. Appl. No. 12/565,750.

Notice of Allowance dated Apr. 4, 2011, received in U.S. Appl. No. 12/565,750.

European Search Report mailed Aug. 20, 2009, for EP Appliction No. 09154312.4, filed Feb. 25, 2009, 10 pages.

International Search Report mailed Feb. 27, 2009, for PCT Application No. PCT/US08/087045, filed Dec. 16, 2008, four pages.

International Search Report mailed Sep. 10, 2009, for PCT Application No. PCT/US2009/035177, filed Feb. 25, 2009, seven pages.

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

Rubine, D.H. (Dec. 1991). "The Automatic Recognition of Gestures," CMU-CS-91-202, Submitted in Partial Fulfillment of the

(56) References Cited

OTHER PUBLICATIONS

Requirements of the Degree of Doctor of Philosophy in Computer Science at Carnegie Mellon University, 285 pages.
Rubine, D.H. (May 1992). "Combining Gestures and Direct Manipulation," CHI '92, pp. 659-660.
Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.
Brighthand, "Thread: Cut, Copy & Paste," Brighthand.com, Jan. 13, 2005, http://forum.brighthand.com/showthread.php?t=82701, 2 pages.
Brighthand, "Thread: How do I cut & paste, & copy on a PDA," Brighthand. Com, Sep. 19, 2004, http://forum.brighthand.com/showthread.php?s=2d32c96c9aaedaa454e3d05962503046&t=77588, 2 pages.
Chen, Y., "Detecting Web Page Structure for Adaptive Viewing on Small Form Factor Devices," Microsoft Research, i-yuchen@microsoft.com, May 20-24, 2003, 9 pages.
FreewarePalm, "CutPaste5 v3.1," FreewarePalm.com, Apr. 5, 2004, http://www.freewarepalm.com/utilities/cutpaste5.shtml, 2 pages.
Jordan, M., "Quick Look in Leopard," Mac Tips, Nov. 7, 2007, 6 pages, http://mactips.info/tips/2007/11/quick-look-in-leopard.
Raskin, A., "Firefox Mobile Concept Video," Aza'S Thoughts, Jun. 11, 2008, http://www.azarask.in/blog/post/firefox-mobile-concept-vido/, 50 pages.
Starrett, C., "iPhone Gems: Top Photography and Image Manipulation Apps,"iLounge, Oct. 8, 2008, 14 pages, http://www.ilounge.com/index.php/articles/comments/iphone-gems-top-photography-and-image-manipulation-apps.
Treo FAQ, "How can I copy and paste text on my Treo?" treocentral.com, downloaded Sep. 4, 2012, http://www.treocentral.com/content/FAQ/110.htm, 1 page.
Vimeo, "iPhone Copy and Paste," lonelysandwich, Sep. 2007, http://www.vimeo.com/266383, 7 pages.
Yatani et al., "Escape: A target Selection Technique Using Visually-cued Gestures," CHI 2008, Apr. 5-10, 2008, Florence, Italy, 10 pages.
YouTube, "Copy/Cut and Paste for iPhone," 3:19 minute video, uploaded to YouTube by madmaxwhatever on Aug. 20, 2008, http://www.youtube.com/watch?v=3-3ZmJL5BCg, 1 page.
YouTube, "Copy and Paste on a Palm Pre," 1:13 minute video uploaded to YouTube by MobileInfocenter on Jan. 9, 2009, http://www.youtube.com/watch?v=IuMEMEBiL_g, 2 pages.
YouTube, "eMind Basic Gestures: Cutting, Copying and Pasting Text," 1:10 minute video uploaded to YouTube by quine42 on Nov. 22, 2008, http://www.youtube.com/watch?v=4QIOYiCcChc, 1 page.
YouTube, "iPhone Cut & Paste with(in) Citrix XenApp," 1:31 minute video uploaded to YouTube by chrisfictxs on Jan. 6, 2009, http://www.youtube.com/watch?v=NJDnQ4DAY3s, 1 page.
European Search Report and Written Opinion dated Mar. 6, 2012, received in European Patent Application No. 11186455.9, which corresponds to U.S. Appl. No. 11/923,453, 9 pages. (Kocienda).
Decision to Grant dated May 15, 2012, received in Chinese Patent Application No. 200780046864.5, which corresponds to U.S. Appl.n No. 11/923,453, 4 pages (Kocienda).
Notice of Allowance dated Apr. 27, 2012, received in U.S. Appl. No. 12/242,852, 25 pages (van Os).
Decision to Grant dated Dec. 30, 2012, received in European Patent Application No. 08873123.7, which corresponds to U.S. Appl. No. 12/242,852, 1 page (van Os).
Notice of Allowance dated Jul. 3, 2012, received in U.S. Appl. No. 12/565,750, 34 pages (Ording).
Final Office Action dated Jun. 22, 2012, received in U.S. Appl. No. 12/565,751, 18 pages (Ording).
Notice of Allowance dated Jun. 5, 2012 received in U.S. Appl. No. 12/565,752, 7 pages (Ording).
Office Action dated Jun. 12, 2012, received in U.S. Appl. No. 12/565,754, 41 pages (Ording).
Notice of Allowance dated May 31, 2012, received in U.S. Appl. No. 12/565,756, 5 pages (Kocienda).
Office Action dated Aug. 2, 2012, received in U.S. Appl. No. 12/565,759, 28 pages (Ording).
Notice of Allowance dated Jun. 11, 2012, received in U.S. Appl. No. 12/565,760, 11 pages (Ording).
Holman et al., "PaperWindows:Interaction Techniques for Digital Paper," Papers: Physical Interaction, CHI 2005, Apr. 2-7, 2005, Portland, Oregon, USA, 9 pages.
W3C, "Cascading Style Sheets," level 2 revision 1 Css 2.1 Specification, Jun. 13, 2005, 14 pages, http://www.w3.org/TR/2005/WD-CSS21-20050613.
International Search Report and Written Opinion dated Jun. 22, 2011, received in International Applicatoin No. PCT/US2010/026947, which corresponds to U.S. Appl. No. 12/565,750, 17 pages (Ording).
Final Office Action dated Oct. 31, 2011, received in U.S. Appl. No. 11/923,453, 23 pages (Kocienda).
Office Action dated Aug. 10, 2011, received in Chinese Patent Application No. 200780046854.5, which corresponds to U.S. Appl. No. 11/923,453, 10 pages (Kocienda).
Final Office Action dated Sep. 21, 2011, received in US. Appl. No. 12/242,852 (van Os).
Notice of Allowance dated Jan. 9, 2012, received in U.S. Appl. No. 12/242,852, 10 pages (van Os).
Decision to Grant dated Sep. 13, 2011, received in European Patent Application No. 08 873 123.7, which corresponds to U.S. Appl. No. 12/242,852, 4 pages (van Os).
Office Action dated Sep. 26, 2011, received in U.S. Appl. No. 12/565,750, 11 pages (Ording).
Final Office Action dated Mar. 26, 2012, received in U.S. Appl. No. 12/565,750, 16 pages (Ording).
Office Action dated Mar. 1, 2012, received in U.S. Appl. No. 12/565,751, 36 pages (Ording).
Office Action dated Jan. 27, 2012, received in U.S. Appl. No. 12/565,752, 33 pages (Ording).
Office Action dated Mar. 13, 2012, received in U.S. Appl. No. 12/565,763, 31 pages (Ording).
Office Action dated Feb. 2, 2012, received in U.S. Appl. No. 12/565,756, 31 pages (Kocienda).
Office Action dated Mar. 2, 2012, received in U.S. Appl. No. 12/565,757, 31 pages (Ording).
Office Action dated Jan. 27, 2012. received in U.S. Appl. No. 12/565,760, 39 pages (Ording).
Final Office Action dated Sep. 1, 2011, received in U.S. Appl. No. 12/820,974, 36 pages (Kennedy).
Office Action dated Dec. 29. 2011, received in U.S. Appl. No. 12/820,974, 26 pages (Kennedy).
Office Action dated Aug. 24, 2011, received in Chinese Patent Application No. 200910116597.9, which corresponds to U.S. Appl. No. 12/042,313, 6 pages (Westerman).
Ahlberg, C. et al., "The Alphaslider: A Compact and Rapid Selector," ACM, Apr. 1994, proceedings of the SIGCHI conference on Human Factors in Computing Systems, pp. 365-371.
Ahlberg et al., "Visual Information Seeking: Tight Coupling of Dynamic Query Filters with Starfield Displays," Human Factors in Computing Systems, Boston MA, Apr. 24-28, 1994, 7 pages.
Ahlström et al., "Overcoming Touchscreen User Fatigue by Workplace Design," Proceeding CHI '92 Posters and short talks of the 1992 SIGCHI conference on Human factors in computing systems ACM, New York, 1992, 2 pages.
Baeza-Yates, R., "Visualization of Large Answers in Text Databases," AVI '96 Proceedings of the Working Conference on Advanced Visual Interfaces, ACM, New York, 1996, 7 pages.
Barthel, B., "Information Access for Visually Impaired Persons: Do We Still Keep a 'Document' in 'Documentation'?" Professional Communication Conference, IPCC '95, Sep. 27-29, 1995, 5 pages.
Bederson et al., "Pad++: A Zooming Graphical Interface for Exploring Alternate Interface Physics," UIST "94, 1994 ACM, 10 pages.
Bernabei et al., "Graphical I/O Devices for Medical Users," Engineering in Medicine and Biology Society, 1992 14th Annual International Conference of the IEEE, Oct. 29-Nov. 1, 1992, Paris, France, 3 pages.

(56) References Cited

OTHER PUBLICATIONS

Burger, D., "Improved Access to Computers for the Visually Handicapped: New Prospects and Principles," IEEE Transactions on Rehabilitation Engineering, vol. 2, No. 3. Sep. 1994, 8 pages.
Eslambolchilaar et al., "Making Sense of Fisheye Views," Second Dynamics and Interaction Workshop at University of Glasgow, Glasgow, Scotland, Aug. 2005, 6 pages.
Furnas, G., "Effective View Navigation," CHI '97 Proceedings of the SIGCHI conference on Human factors in computing systems, ACM, New York, 1997, 8 pages.
Furnas, G., "Generalized Fisheye Views," ACM SIGCHI Bulletin, Special Issue:CHI '86 Conference Proceedings, vol. 17, Issue 4, Apr. 1986, 8 pages.
Furnas, G., "The Fisheye Calendar System," Bellcore Technical Memorandum, Nov. 19, 1991, 9 pages.
Greenberg, S., "A Fisheye Text Editor for Relaxed-WYSIWIS Groupware," CHI '96 Companion, Vancouver, BC, Canada, Apr. 13-18, 1996, 2 pages.
Hinckley et al., "A survey of Design Issues in Spatial Input," Proceedings of the ACM Symposium on User Interface Software and Technology, Nov. 2-4, 1994, 10 pages.
Kamba et al., "Using small screen space more efficiently," CHI '96, Vancouver, BC, Canada, Apr. 13-18, 1996, 8 pages.
Keahey et al., "Non-Linear Image Magnification," Department of Computer Science, Indiana University, Apr. 24, 1996, 11 pages.
Keahey et al., "Nonlinear Magnification Fields," Department of Computer Science, Indiana University, Proceedings of the 1997 IEEE Symposium on Information Visualization, 12 pages.
Keahey et al., "Techniques for Non-Linear Magnification Transformations," Proceedings of the 1996 Symposium on Information Visualization, 8 pages.
Keahey et al., "Viewing Text With Non-Linear Magnification: An Experimental Study," Department of Computer Science, Indianan University, Apr. 24, 1996, 9 pages.
Kline et al., "Improving GUI Accessibility for People with Low Vision," Proceedings of the SIGCHI conference on Human factors in computing systems, May 7-11, 1995, 10 pages.
Kline et al., "UnWindows 1.0: X Windows Tools for Low Vision Users," Newsletter ACM SIGCHI Computers and the Physically Handicapped, Issue 49, Mar. 1994, 5 pages.
Lazzaro, J., "Adapting desktop computers to meet the needs of disabled workers is easier than you might think," Byte Magazine, Jun. 1993, #144, 5 pages.
Lemmons et al., "Hewlett-Packard makes some magic," Product Review, Byte Publications Inc., Oct. 1983, 15 pages.
Leung et al., "A Review and Taxonomy of Distortion-Oriented Presentation Techniques," ACM Transactions on Computer-Human Interaction, vol. 1, No. 2, Jun. 1994, 35 pages.
Lieberman, H., "A Multi-Scale, Multi-Layer, Translucent Virtual Space," First International Conference on Information Visualization (IV'97), London, England, Aug. 27-28, 8 pages.
Lieberman, H., "Powers of Ten Thousand: Navigating in Large Information Spaces," Proceedings of the ACM Symposium on User Interface Software and Technology, Nov. 2-4, 1994, 2 pages.
MacKenzie et al., "Alphanumeric entry on pen-based computers," International Journal of Human-Computer Studies (1994) 41, 18 pages.
NCIP staff, "Magnification Technology," National Center to Improve Practice in Special Education Through Technology, Media, and Materials, 1994, 7 pages, http://www2.edc.org/ncip/library/vi/magnifi.htm.
Noik, G., "Layout-independent Fisheye Views of Nested Graphs," in VL'93: IEEE Symposium on Visual Languages, IEEE 1993, 6 pages.
Plaisant et all., "Touchscreen Toggle Design," Proceedings of the Conference on Human Factors in Computing Systems, Addison Wesley, US, May 3, 1992, 2 pages.
Robertson et al., "The Document Lens," UIST '93 Proceedings of the 6th annual ACM symposium on User interface software and technology, ACM, New York, 1993, 8 pages.
Rosner et al., "In Touch: A Graphical User Interface Development Tool," Software Tools for Interface Design, IEEE Colloquium, London, UK, Nov. 8, 1990, 7 pages.
Sarkar et al., "Graphical Fisheye Views of Graphs," CHI'92, Proceedings of the SIGCHI conference on Human Factors in Computing Science, May 3-7, 1992, ACM N Y, 1992, 9 pages.
Sarkar et al., "Graphical Fisheye Views of Graphs," Mar. 17, 1992, DEC/Systems Research Center 1992, 31 pages.
Sarkar et al., "Graphical Fisheye Views," Communications of the ACM, Dec. 1994, vol. 37, No. 12, 12 pages.
Sarkar et al., "Stretching the Rubber Sheet: A Metaphor for Viewing Large Layouts on Small Screens," Proceedings of the ACM Symposium on User Interface Software and Technology, Nov. 3-5, 1993, 11 pages.
Sheelagh et al., "3-Dimensional Pliable Surfaces: For the Effective Presentation of Visual Information," 1995 User Interface Software & Technology, 11 pages.
Sheelagh et al., "Extending Distortion Viewing from 2D to 3D," IEEE Computer Graphics and Applications, vol. 17, Issue 4, Jul./Aug. 1997, 10 pages.
Sheelagh et al., "Making Distortions Comprehensible," Proceedings of Symposium on Visual Languages, 1997, 10 pages.
Simkovitz, D., "LP-DOS Magnifies the PC Screen," Proceedings of the Johns Hopkins National Search for Computing Applications to Assist Persons with Disabilities, Feb. 1-5, 1992, 2 pages.
Su, J., "A Review of Telesensory's Vista PCI Screen Magnification System," Journal of Visual Impairment & Blindness, Oct. 1998, 5 pages.
Su et al., "A Review of Supernova Screen Magnification Program for Windows," Journal of Visual Impairment & Blindness, Feb. 1999, 3 pages.
Su et al., "A Review of Zoom Text Xtra Screen Magnification Program for Windows 95," Journal of Visual Impairment & Blindness, Feb. 1998, 4 pages.
Uslan et al., "A Review of Henter-Joyce's MAGic for Windows NT," Journal of Visual Impairment and Blindness, Oct. 1999, 3 pages.
Uslan et al., "A Review of Two Screen Magnification Programs for Windows 95: Magnum 95 and LP-Windows," Journal of Visual Impairment & Blindness, Sep.-Oct. 1997, 5 pages.
Vogel et al., "Shift: A Technique for Operating Pen-Based Interfaces Using Touch," CHI 2007, Apr. 28-May 3, 2007, 10 pages.
Advances in Human-Computer Interaction, Chapters 1, 5, and 6, Ablex Publishing Corporation, 1992, 121 pages.
Bederson et al., "The Craft of Information Visualization," Elsevier Science (USA) 2003, 435 pages.
Benel et al., "Optimal Size and Spacing of Touch Screen Input Areas," INTERACT'87—2nd IFIP International Conference on Human-Computer Interaction, Sep. 1-4, 1987, Stuttgart, Germany, 5 pages.
Beringer et al., "Operator Behavioral Biases Using High-Resolution Touch Input Devices," Proceedings of the Human Factors Society 33rd Annual Meeting, 1989, 3 pages.
Beringer, D., Target Size, Location, Sampling Point and Instructional Set: More Effects on Touch Panel Operation, Proceedings of the Human Factors Society 34th Annual Meeting, 1990, 5 pages.
Bier, et al., "Toolglass and Magic Lenses: The See-Through Interface," Proceedings of SIGGRAPH '93, ACM 1993, 18 pages.
Brown et al., "Browsing Graphs Using a Fisheye View," INTERCHI '93, Apr. 24-29, 1993, ACM 1993, 1 page.
Card et al., "Readings in Information Visualization Using Vision to Think," Morgan Kaufman Publishers, Inc., 1999, 711 pages.
Degani et al., "'Soft' Controls for Hard Displays: Still a Challenge," Proceedings of the Human Factors Society 36th Annual Meeting, 1992, 5 pages.
Furnas et al., "Space-Scale Diagrams: Understanding Multiscale Interfaces," CHI '95 Proceedings of the SIGCHI conference on Human factors in computing systems, ACM Press/Addison-Wesley Publishing Co. New York, NY, USA, 1995, 12 pages.
IBM, "Simon Says 'Here's How!'" Simon Users Manual, IBM Corp 1994, 63 pages.
Johnson, J., "A Comparison of User Interfaces for Panning on a Touch-Controlled Display," CHI '95 Proceedings, ACM 1995, 18 pages.

(56) References Cited

OTHER PUBLICATIONS

Lamping et al., "Laying out and Visualizing Large Trees Using a Hyperbolic Space," Proceedings of the 7th Annual ACM Symposium on User Interface Software and Technology, Nov. 2-4, 1994, ACM New York, NY, USA, 1994, 2 pages.

Leahy et al., "Effect of Touch Screen Target Location on User Accuracy," Proceeding of the Human Factors Society 34th Annual Meeting, 1990, 5 pages.

Mackinlay et al., "The Perspective Wall: Detail and Context Smoothly Integrated," Proceedings of CHI '91 ACM Conference on Human Factors in Computing Systems, ACM 1991, 7 pages.

Milner, N., "A Review of Human Performance and Preferences with Different Input Devices to Computer Systems," Proceedings of the 4th Conference of the British Computer Society on People and Computers, Cambridge University Press, 1988, 22 pages.

Phillipps, B., "Touchscreens are changing the face of computers," Electronic Products 1994, 7 pages.

Pickering, J., "Touch-sensitive screens: the technologies and their application," Int. J. Man-Machine Studies (1986), 21 pages.

Plaisant et al., "Touchscreen Interfaces for Alphanumeric Data Entry," Proceedings of the Human Factors Society 36th Annual Meeting, 1992, 5 pages.

Potter et al., "An Experimental Evaluation of Three Touch Screen Strategies within a Hypertext Database," International Journal of Human-Computer Interaction 1 (1) 41-52, 1989, 12 pages.

Potter et al., "Improving the Accuracy of Touch Screens: An Experimental Evaluation of Three Strategies," CHI '88 Proceedings of the SIGCHI conference on Human factors in computing s stems, ACM New York, NY, USA, 1988, 6 pages.

Rao et al., "Exploring Large Tables with the Table Lens," CHI '95 Mosaic of Creativity, May 7-11, 1995, CHI' Companion 95, Denver, Colorado, USA, 2 pages.

Rao et al., "The Table Lens: Merging Graphical and Symbolic Representations in an Interactive Focus+Context Visualization for Tabular Information," Proceedings of the ACM SIGCHI Conference on Human Factors in Computing Systems, Boston, MA, Apr. 1994, 7 pages.

Ren et al., "Efficient strategies for selecting small targets on pen-based systems: an evaluation experiment for selection strategies and strategy classifications," Proceedings of the IFIP Tc2/TC13 WG2.7/WG13.4 Seventh Working Conference on Engineering for Human-Computer Interaction, Kluver, B.V. Deventer, The Netherlands, 1999, 19 pages.

Ren et al., "Improving Selection Performance on Pen-Based Systems: A Study of Pen-Based Interaction for Selection Tasks," ACM Transactions on Computer-Human Interaction, vol. 7, No. 3, Sep. 2000, 33 pages.

Ren et al., "The Best among Six Strategies for Selecting a Minute Target and the Determination of the Minute Maximum Size of the Targets on a Pen-Based Computer," INTERACT '97 Proceedings of the IFIP TC 13 International Conference on Human-Computer Interaction, Chapman & Hall, Ltd. London, UK, UK, 1997, 8 pages.

Riecken, R., "Adaptive Direct Manipulation," IEEE International Conference Proceedings on Systems, Man, and Cybernetics, Decision Aiding for Complex Systems, 1991, 6 pages.

Robertson et al., "Information Visualization Using 3D Interactive Animation," Communications of the ACM, Apr. 1993, vol. 36, No. 4, 15 pages.

Schaffer et al., "Navigating Hierarchically Clustered Networks through Fisheye and Full-Zoom Methods," ACM Transactions on Computer-Human Interaction, vol. 3, No. 2, Jun. 1996, 27 pages.

Scott et al., "Designing Touch Screen Numeric Keypads: Effects of Finger Size, Key Size, and Key Spacing," Proceedings of the Human Factors and Ergonomics Society 41st Annual Meeting, 1997, 5 pages.

Sears et al., "High precision touchscreens: design strategies and comparisons with a mouse," Int. J. Man-Machine Studies (1991) 34, 21 pages.

Sears et al., "Investigating touchscreen typing: the effect of keyboard size on typing speed," Behavior & Information Technology, 1993, vol. 12, No. 1, 6 pages.

Shneiderman, B., "Designing the User Interface Strategies for Effective Human-Computer Interaction," Second Edition, Addison-Wesley Publishing Company 1992, 599 pages.

Shneiderman, B., "Designing the User Interface Strategies for Effective Human-Computer Interaction," Third Edition, Addison-Wesley Publishing Company 1998, 669 pages.

Shneiderman, B., "Direct Manipulation for Comprehensible, Predictable and Controllable User Interfaces," IUI '97 Proceedings of the 2nd International Conference on Intelligent User Interfaces, ACM New York, New York, USA 1997, 7 pages.

Shneiderman, B., "The Eyes Have It: A Task by Data Type Taxonomy for Information Visualizations," Proceedings of the 1996 IEEE Symposium on Visual Languages (VL '96), 1996 IEEE, 8 pages.

Shneiderman, B., "Touch Screens Now Offer Compelling Uses," Interface IEEE Software, Mar. 1991, 2 pages.

Smith, R., "Relating Distortion to Performance in Distortion Oriented Displays," Proceedings Sixth Australian Conference on Computer-Human Interaction, 1996, Hamilton, New Zealand, 6 pages.

Sparks of Innovation in Human-Computer Interaction, B. Shneiderman, Ed., Ablex Publ., Norwood, N.J.; (1993), various sections, 133 pages.

Stone et al., "The Movable Filter as a User Interface Tool," CHI '94 Proceedings of SIGCHI conference on Human factors in computing systems: celebrating interdependence, ACM New York, NY, USA, 1994, 7 pages.

Ware et al., "The DragMag Image Magnifier," CHI '95 Mosaic of Creativity, May 7-11, 1995, ACM 1995. 2 pages.

Final Office Action dated Aug. 15, 2012, received in U.S. Appl. No. 12/565,753, 11 pages (Ording).

Office Action dated Jul. 26, 2012, received in U.S. Appl. No. 12/565,755, 31 pages (Kocienda).

Final Office Action dated Aug. 15, 2012, received in U.S. Appl. No. 12/565,757, 12 pages (Ording).

Notice of Allowance dated Oct. 2, 2012, received in U.S. Appl. No. 12/565,760, 13 pages (Ording).

Notice of Allowance dated Aug. 3, 2012, received in U.S. Appl. No. 12/820,974, 8 pages (Kennedy).

Decision to Grant dated Jun. 5, 2012, received in Chinese Patent Application No. 200910118597.9, which corresponds to U.S. Appl. No. 12/042,313, 1 page (Westerman).

* cited by examiner

SELECTING OF TEXT USING GESTURES

FIELD OF THE INVENTION

The disclosed embodiments relate generally to selecting text displayed on a display screen, and more particularly, to selecting text using gestures on a multi-touch sensitive display screen.

BACKGROUND OF THE INVENTION

As portable electronic devices become more compact, and the number of functions performed by a given device increase, it has become a significant challenge to design a user interface that allows users to easily interact with a multifunction device. This challenge is particular significant for handheld portable devices, which have much smaller screens than desktop or laptop computers. This situation is unfortunate because the user interface is the gateway through which users receive not only content but also responses to user actions or behaviors, including user attempts to access a device's features, tools, and functions. Some portable communication devices (e.g., mobile telephones, sometimes called mobile phones, cell phones, cellular telephones, and the like) have resorted to adding more pushbuttons, increasing the density of push buttons, overloading the functions of pushbuttons, or using complex menu systems to allow a user to access, store and manipulate data. These conventional user interfaces often result in complicated key sequences and menu hierarchies that must be memorized by the user.

Many conventional user interfaces, such as those that include physical pushbuttons, are also inflexible. This is unfortunate because it can prevent a user interface from being configured and/or adapted by either an application running on the portable device or by users. When coupled with the time consuming requirement to memorize multiple key sequences and menu hierarchies, and the difficulty in activating a desired pushbutton, such inflexibility is frustrating to most users.

Most portable electronic devices include applications that use text entry. Such applications can include instant messaging applications, email applications, and word processing applications, as well as other applications with text input. Because the screens on portable electronic devices are relatively small, the text and corresponding text entry tools are relatively small as well. Typically, selecting text displayed in on the device has not been available or has been very cumbersome. To date, portable electronic devices have not provided an easy, efficient way to position a text selection area in text displayed on a portable electronic device.

Accordingly, there is a need for portable multifunction devices with more intuitive user interfaces for positioning a text selection area in text and modifying endpoints of the text selection area that are easy to use, configure, and/or adapt. Such interfaces increase the effectiveness, efficiency and user satisfaction with portable multifunction devices.

SUMMARY OF THE INVENTION

The above deficiencies and other problems associated with user interfaces for portable devices can be reduced or eliminated by the disclosed portable multifunction device. In some embodiments, the device can have a touch-sensitive display (also known as a "touch screen") with a graphical user interface (GUI), one or more processors, memory and one or more modules, programs or sets of instructions stored in the memory for performing multiple functions. In some embodiments, the user can interact with the GUI primarily through finger contacts and gestures on the touch-sensitive display. In some embodiments, the functions can include telephoning, video conferencing, e-mailing, instant messaging, blogging, digital photographing, digital videoing, web browsing, digital music playing, and/or digital video playing. Instructions for performing these functions can be included in a computer program product configured for execution by one or more processors.

In accordance with some embodiments, a computer-implemented text selection method is performed using an electronic device having a touch-sensitive display. The method can include displaying text on the touch screen display; detecting a text selection initiation gesture with the touch screen display; and in response to the text selection initiation gesture, inserting a text selection area bounded by a first endpoint located in the text at a first location and a second endpoint in the text at a second location. Word processing function can be performed on the on the text located in the text selection area.

BRIEF DESCRIPTION OF THE DRAWINGS

For a better understanding of the aforementioned embodiments of the invention as well as additional embodiments thereof, reference should be made to the Detailed Description of the Embodiments below, in conjunction with the following drawings in which like reference numerals refer to corresponding parts throughout the figures.

DETAILED DESCRIPTION OF THE PREFERRED EMBODIMENTS

Figure 1:
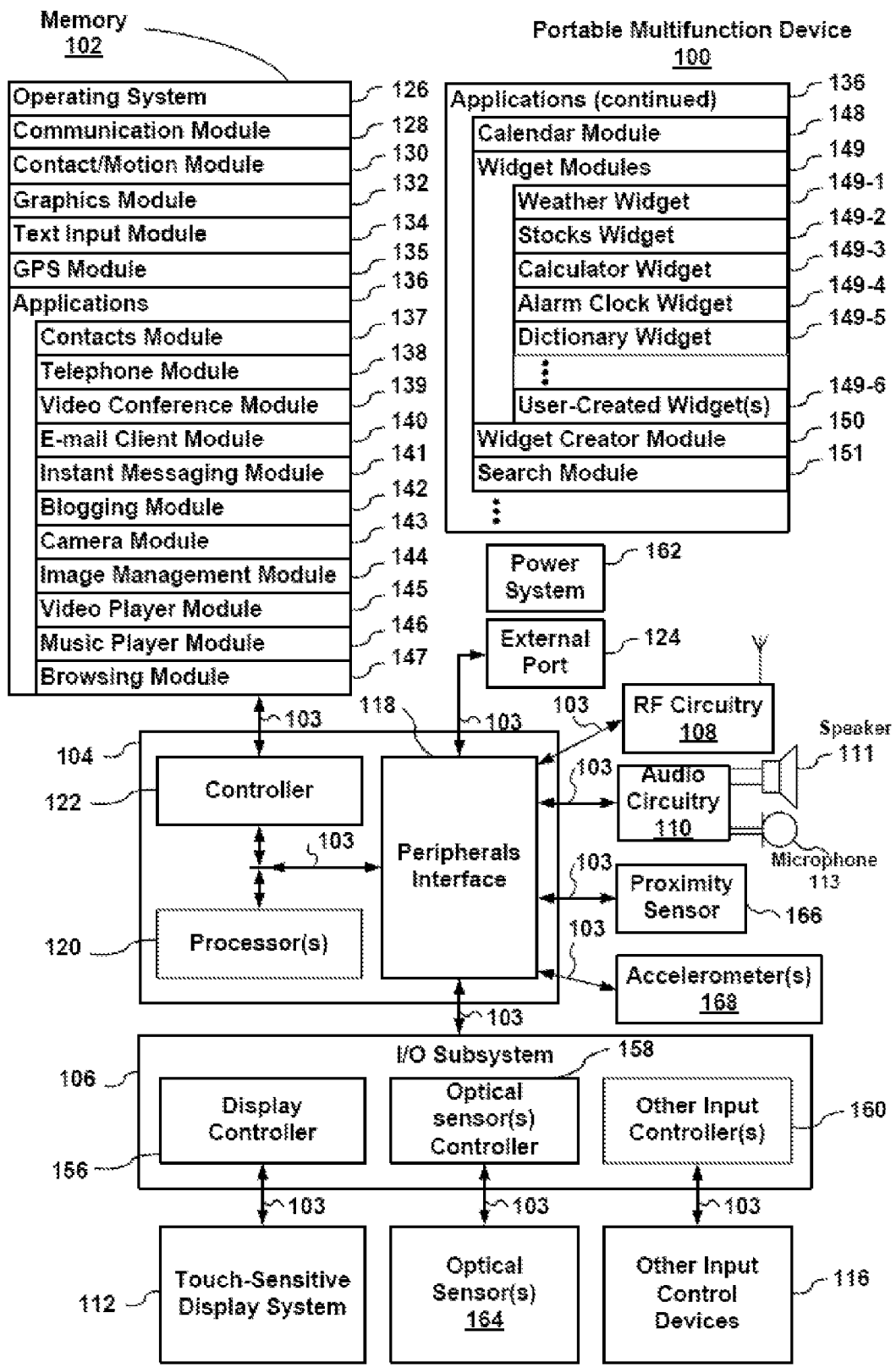
FIG. 1 is a block diagram illustrating a portable multifunction device with a touch-sensitive display in accordance with some embodiments.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention can be practiced without these specific details. In other instances, well-known methods, procedures, components, circuits, and networks have not been described in detail so as not to unnecessarily obscure aspects of the embodiments.

It will also be understood that, although the terms first, second, etc. can be used herein to describe various elements, these elements should not be limited by these terms. These terms are only used to distinguish one element from another. For example, a first gesture could be termed a second gesture, and, similarly, a second gesture could be termed a first gesture, without departing from the scope of the present invention.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of a portable multifunction device, user interfaces for such devices, and associated processes for using such devices are described. In some embodiments, the device is a portable communications device such as a mobile telephone that also contains other functions, such as PDA and/or music player functions.

For simplicity, in the discussion that follows, a portable multifunction device that includes a touch screen is used as an exemplary embodiment. It should be understood, however, that some of the user interfaces and associated processes can be applied to other devices, such as personal computers and laptop computers, which can include one or more other physical user-interface devices, such as a physical click wheel, a physical keyboard, a mouse and/or a joystick.

The device can support a variety of applications, such as a telephone application, a video conferencing application, an e-mail application, an instant messaging application, a blogging application, a digital camera application, a digital video camera application, a web browsing application, a digital music player application, and/or a digital video player application.

The various applications that can be executed on the device can use at least one common physical user-interface device, such as a touch screen. One or more functions of the touch screen, as well as corresponding information displayed on the device, can be adjusted and/or varied from one application to the next and/or within a respective application. In this way, a common physical architecture (such as the touch screen) of the device can support a variety of applications with user interfaces that can be intuitive and transparent.

The user interfaces can include one or more soft keyboard embodiments. The soft keyboard embodiments can include standard (QWERTY) and/or non-standard configurations of symbols on the displayed icons of the keyboard, such as those described in U.S. patent application Ser. Nos. 11/459,606, "Keyboards For Portable Electronic Devices," filed Jul. 24, 2006, and Ser. No. 11/459,615, "Touch Screen Keyboards For Portable Electronic Devices," filed Jul. 24, 2006, the contents of which are hereby incorporated by reference. The keyboard embodiments can include a reduced number of icons (or soft keys) relative to the number of keys in existing physical keyboards, such as that for a typewriter. This can make it easier for users to select one or more icons in the keyboard, and thus, one or more corresponding symbols. The keyboard embodiments can be adaptive. For example, displayed icons can be modified in accordance with user actions, such as selecting one or more icons and/or one or more corresponding symbols. One or more applications on the portable device can utilize common and/or different keyboard embodiments. Thus, the keyboard embodiment used can be tailored to at least some of the applications. In some embodiments, one or more keyboard embodiments can be tailored to a respective user. For example, one or more keyboard embodiments can be tailored to a respective user based on a word usage history (lexicography, slang, individual usage) of the respective user. Some of the keyboard embodiments can be adjusted to reduce a probability of a user error when selecting one or more icons, and thus one or more symbols, when using the soft keyboard embodiments.

Attention is now directed towards embodiments of the device. FIG. 1 is a block diagram illustrating portable multifunction device 100 with touch-sensitive display 112 in accordance with some embodiments. Touch-sensitive display 112 is sometimes referred to as a "touch screen" for convenience, and can also be known or referred to as a touch-sensitive display system. Device 100 can include memory 102 (which can include one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 can include one or more optical sensors 164. These components can communicate over one or more communication buses or signal lines 103.

It should be appreciated that device 100 is only one example of a portable multifunction device 100, and that device 100 can have more or fewer components than shown, can combine two or more components, or a can have a different configuration or arrangement of the components. The various components shown in FIG. 1 can be implemented in hardware, software or a combination of both hardware and software, including one or more signal processing and/or application specific integrated circuits.

Memory 102 can include high-speed random access memory and can also include non-volatile memory, such as one or more magnetic disk storage devices, flash memory devices, or other non-volatile solid-state memory devices. Access to memory 102 by other components of device 100, such as CPU 120 and the peripherals interface 118, can be controlled by memory controller 122.

Peripherals interface 118 can couple input and output peripherals of device 100 to CPU 120 and memory 102. One or more processors 120 can run or execute various software programs and/or sets of instructions stored in memory 102 to perform various functions for device 100 and to process data.

In some embodiments, peripherals interface 118, the CPU 120, and the memory controller 122 can be implemented on a single chip, such as a chip 104. In some other embodiments, they can be implemented on separate chips.

RF (radio frequency) circuitry 108 can receive and send RF signals, also called electromagnetic signals. RF circuitry 108 can convert electrical signals to/from electromagnetic signals and communicates with communications networks and other communications devices via the electromagnetic signals. RF circuitry 108 can include well-known circuitry for performing these functions, including but not limited to an antenna system, a RF transceiver, one or more amplifiers, a tuner, one or more oscillators, a digital signal processor, a CODEC chipset, a subscriber identity module (SIM) card, memory, and so forth. RF circuitry 108 can communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication can use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), and/or Instant Messaging and Presence Service (IMPS)), and/or Short Message Service (SMS)), or any other suitable communication protocol, including communication protocols not yet developed as of the filing date of this document.

Audio circuitry 110, speaker 111, the microphone 113 can provide an audio interface between a user and device 100. Audio circuitry 110 can receive audio data from peripherals interface 118, convert the audio data to an electrical signal, and transmit the electrical signal to speaker 111. Speaker 111 can convert the electrical signal to human-audible sound waves. Audio circuitry 110 can also receive electrical signals converted by microphone 113 from sound waves. Audio circuitry 110 can convert the electrical signal to audio data and transmit the audio data to the peripherals interface 118 for processing. Audio data can be retrieved from and/or transmitted to memory 102 and/or RF circuitry 108 by peripherals interface 118. In some embodiments, audio circuitry 110 can also include a headset jack (e.g. 212, FIG. 2). The headset jack can provide an interface between audio circuitry 110 and removable audio input/output peripherals, such as output-only headphones or a headset with both output (e.g., a headphone for one or both ears) and input (e.g., a microphone).

I/O subsystem 106 can couple input/output peripherals on device 100, such as touch screen 112 and other input/control devices 116, to the peripherals interface 118. The I/O subsystem 106 can include a display controller 156 and one or more input controllers 160 for other input or control devices. One or more input controllers 160 can receive/send electrical signals from/to other input or control devices 116. Other input/control devices 116 can include physical buttons (e.g., push buttons, rocker buttons, etc.), dials, slider switches, joysticks, click wheels, and so forth. In some alternate embodiments, input controller(s) 160 can be coupled to any (or none) of the following: a keyboard, infrared port, USB port, and a pointer device such as a mouse. One or more buttons (e.g., 208, FIG. 2) can include an up/down button for volume control of speaker 111 and/or microphone 113. One or more buttons can include push button (e.g., 206, FIG. 2). A quick press of the push button can disengage a lock of touch screen 112 or begin a process that uses gestures on the touch screen to unlock the device, as described in U.S. patent application Ser. No. 11/322,549, "Unlocking a Device by Performing Gestures on an Unlock Image," filed Dec. 23, 2005, which is hereby incorporated by reference. A longer press of the push button (e.g., 206) can turn power to the device 100 on or off. The user can be able to customize a functionality of one or more of the buttons. The touch screen 112 is used to implement virtual or soft buttons and one or more soft keyboards.

Touch-sensitive touch screen 112 can provide an input interface and an output interface between the device and a user. Display controller 156 can receive and/or send electrical signals from/to touch screen 112. Touch screen 112 can display visual output to the user. The visual output can include graphics, text, icons, video, and any combination thereof (collectively termed "graphics"). In some embodiments, some or all of the visual output can correspond to user-interface objects, further details of which are described below.

Touch screen 112 can have a touch-sensitive surface, sensor or set of sensors that accepts input from the user based on haptic and/or tactile contact. Touch screen 112 and display controller 156 (along with any associated modules and/or sets of instructions in memory 102) can detect contact (and any movement or breaking of the contact) on touch screen 112 and can convert the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 can use LCD (liquid crystal display) technology, or LPD (light emitting polymer display) technology, although other display technologies can be used in other embodiments. Touch screen 112 and display controller 156 can detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112.

A touch-sensitive display in some embodiments of touch screen 112 can be analogous to the multi-touch sensitive tablets described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference. However, touch screen 112 can display visual output from the portable device 100, whereas touch sensitive tablets do not provide visual output.

A touch-sensitive display in some embodiments of touch screen 112 can be as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein.

Touch screen 112 can have a resolution in excess of 100 dpi. In an exemplary embodiment, touch screen 112 can have a resolution of approximately 160 dpi. The user can make contact with touch screen 112 using any suitable object or appendage, such as a stylus, a finger, and so forth. In some embodiments, the user interface is designed to work primarily with finger-based contacts and gestures, which can be much less precise than stylus-based input due to, typically, the larger area of contact of a finger on touch screen 112. In some embodiments, device 100 can translate the rough finger-based input into a precise pointer/cursor position or command for performing the actions desired by the user.

In some embodiments, in addition to the touch screen 112, device 100 can include a touchpad (not shown) for activating or deactivating particular functions. In some embodiments, the touchpad can be a touch-sensitive area of the device that, unlike the touch screen, does not display visual output. The touchpad can be a touch-sensitive surface that is separate from touch screen 112 or an extension of the touch-sensitive surface formed by touch screen 112.

In some embodiments, device 100 can include a physical or virtual click wheel as an input control device 116. A user can navigate among and interact with one or more graphical objects (henceforth referred to as icons) displayed in touch screen 112 by rotating the click wheel or by moving a point of contact with the click wheel (e.g., where the amount of movement of the point of contact is measured by its angular displacement with respect to a center point of the click wheel). The click wheel can also be used to select one or more of the displayed icons. For example, the user can press down on at least a portion of the click wheel or an associated button. User commands and navigation commands provided by the user via the click wheel can be processed by input controller 160 as well as one or more of the modules and/or sets of instructions in memory 102. For a virtual click wheel, the click wheel and click wheel controller can be part of touch screen 112 and display controller 156, respectively. For a virtual click wheel, the click wheel can be either an opaque or semitransparent object that appears and disappears on the touch screen display in response to user interaction with the device. In some embodiments, a virtual click wheel is displayed on the touch screen of a portable multifunction device and operated by user contact with the touch screen.

Device 100 can also include power system 162 for powering the various components. Power system 162 can include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 can also include one or more optical sensors 164. FIG. 1 shows optical sensor(s) 164 coupled to optical sensor controller 158 in I/O subsystem 106. Optical sensor(s) 164 can include charge-coupled device (CCD) or complementary metal-oxide semiconductor (CMOS) phototransistors. Optical sensor(s) 164 can receive light from the environment, projected through one or more lens, and convert the light to data representing an image. In conjunction with imaging module 143 (also called a camera module), optical sensor 164 can capture still images or video. In some embodiments, optical sensor can be located on the back of device 100, opposite touch screen display 112 on the front of the device, so that touch screen display 112 can be used as a viewfinder for either still and/or video image acquisition. In some embodiments, an optical sensor 164 can be located on the front of the device so that the user's image can be obtained for videoconferencing while the user views the other video conference participants on the touch screen display. In some embodiments, the position of the optical sensor 164 can be changed by the user (e.g., by rotating the lens and the sensor in the device housing) so that a single optical sensor 164 can be used along with touch screen display 112 for both video conferencing and still and/or video image acquisition.

Device 100 can also include one or more proximity sensors 166. FIG. 1 shows proximity sensor 166 coupled to peripherals interface 118. Alternately, proximity sensor 166 can be coupled to input controller 160 in I/O subsystem 106. In some embodiments, proximity sensor 166 turns off and disables touch screen 112 when the multifunction device is placed near the user's ear (e.g., when the user is making a phone call). In some embodiments, proximity sensor 166 keeps touch screen 112 off when device 100 is in the user's pocket, purse, or other dark area to prevent unnecessary battery drainage when device 100 is a locked state.

Device 100 can also include one or more accelerometers 168. FIG. 1 shows accelerometer 168 coupled to peripherals interface 118. Alternately, accelerometer 168 can be coupled to input controller 160 in I/O subsystem 106. The accelerometer 168 can perform as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are which are incorporated herein by reference. In some embodiments, information can be displayed on touch screen display 112 in a portrait view or a landscape view based on an analysis of data received from the one or more accelerometers.

In some embodiments, software components stored in memory 102 can include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or set of instructions) 136.

Operating system 126 (e.g., Darwin, RTXC, LINUX, UNIX, OS X, WINDOWS, or an embedded operating system such as VxWorks) can include various software components and/or drivers for controlling and managing general system tasks (e.g., memory management, storage device control, power management, etc.) and can facilitate communication between various hardware and software components.

Communication module 128 can facilitate communication with other devices over one or more external ports 124 and can also include various software components for handling data received by RF circuitry 108 and/or external port 124. External port 124 (e.g., Universal Serial Bus (USB), FIREWIRE, etc.) can be adapted for coupling directly to other devices or indirectly over a network (e.g., the Internet, wireless LAN, etc.). In some embodiments, external port can be a multi-pin (e.g., 30-pin) connector that is the same as, or similar to and/or compatible with the 30-pin connector used on iPod (trademark of Apple Computer, Inc.) devices.

Contact/motion module 130 can detect contact with touch screen 112 (in conjunction with display controller 156) and other touch sensitive devices (e.g., a touchpad or physical click wheel). Contact/motion module 130 can include various software components for performing various operations related to detection of contact, such as determining if contact has occurred, determining if there is movement of the contact and tracking the movement across touch screen 112, and determining if the contact has been broken (i.e., if the contact has ceased). Determining movement of the point of contact can include determining speed (magnitude), velocity (magnitude and direction), and/or an acceleration (a change in magnitude and/or direction) of the point of contact. These operations can be applied to single contacts (e.g., one finger contacts) or to multiple simultaneous contacts (e.g., "multi-touch"/multiple finger contacts). In some embodiments, contact/motion module 130 and display controller 156 can also detect contact on a touchpad. In some embodiments, contact/motion module 130 and controller 160 can detect contact on a click wheel.

Graphics module 132 can include various known software components for rendering and displaying graphics on touch screen 112, including components for changing the intensity of graphics that are displayed. As used herein, the term "graphics" includes any object that can be displayed to a user, including without limitation text, web pages, icons (such as user-interface objects including soft keys), digital images, videos, animations and the like. An animation in this context is a display of a sequence of images that gives the appearance of movement, and informs the user of an action that has been performed (such as moving an email message to a folder). In this context, a respective animation that confirms an action by the user of the device typically takes a predefined, finite amount of time, such as an amount of time between 0.2 and 1.0 seconds, or between 0.5 and 2.0 seconds, depending on the context.

Text input module 134, which can be a component of graphics module 132, can provide soft keyboards for entering text in various applications (e.g., contacts 137, e-mail 140, IM 141, blogging 142, browser 147, and any other application that needs text input).

GPS module 135 can determine the location of device 100 and can provide this information for use in various applications (e.g., to telephone 138 for use in location-based dialing, to camera 143 and/or blogger 142 as picture/video metadata, and to applications that provide location-based services such as weather widgets, local yellow page widgets, and map/navigation widgets).

Applications 136 can include the following modules (or sets of instructions), or a subset or superset thereof:
  contacts module 137 (sometimes called an address book or contact list);
  telephone module 138;
  video conferencing module 139;
  e-mail client module 140;
  instant messaging (IM) module 141;
  blogging module 142;
  camera module 143 for still and/or video images;
  image management module 144;
  video player module 145;
  music player module 146;
  browser module 147;
  calendar module 148;
  widget modules 149, which can include weather widget 149-1, stocks widget 149-2, calculator widget 149-3, alarm clock widget 149-4, dictionary widget 149-5, and other widgets obtained by the user, as well as user-created widgets 149-6;
  widget creator module 150 for making user-created widgets 149-6;
  search module 151;
  video and music player module 152, which merges video player module 145 and music player module 146;
  notes module 153; and/or
  map module 154.

Examples of other applications 136 that can be stored in memory 102 include other word processing applications, JAVA-enabled applications, encryption, digital rights management, voice recognition, and voice replication.

Each of the above identified modules and applications can correspond to a set of instructions for performing one or more functions described above. These modules (i.e., sets of instructions) need not be implemented as separate software programs, procedures or modules, and thus various subsets of these modules can be combined or otherwise re-arranged in various embodiments. For example, video player module 145 can be combined with music player module 146 into a single module (e.g., video and music player module 152, FIG. 1B). In some embodiments, memory 102 can store a subset of the modules and data structures identified above. Furthermore, memory 102 can store additional modules and data structures not described above.

In some embodiments, device 100 can be a device where operation of a predefined set of functions on the device can be performed exclusively through touch screen 112 and/or touchpad. By using touch screen and/or a touchpad as the primary input/control device for operation of device 100, the number of physical input/control devices (such as push buttons, dials, and the like) on device 100 can be reduced.

The predefined set of functions that can be performed exclusively through a touch screen and/or a touchpad include navigation between user interfaces. In some embodiments, the touchpad, when touched by the user, can navigate device 100 to a main, home, or root menu from any user interface that can be displayed on device 100. In such embodiments, the touchpad can be referred to as a "menu button." In some other embodiments, the menu button can be a physical push button or other physical input/control device instead of a touchpad.

Figure 2:
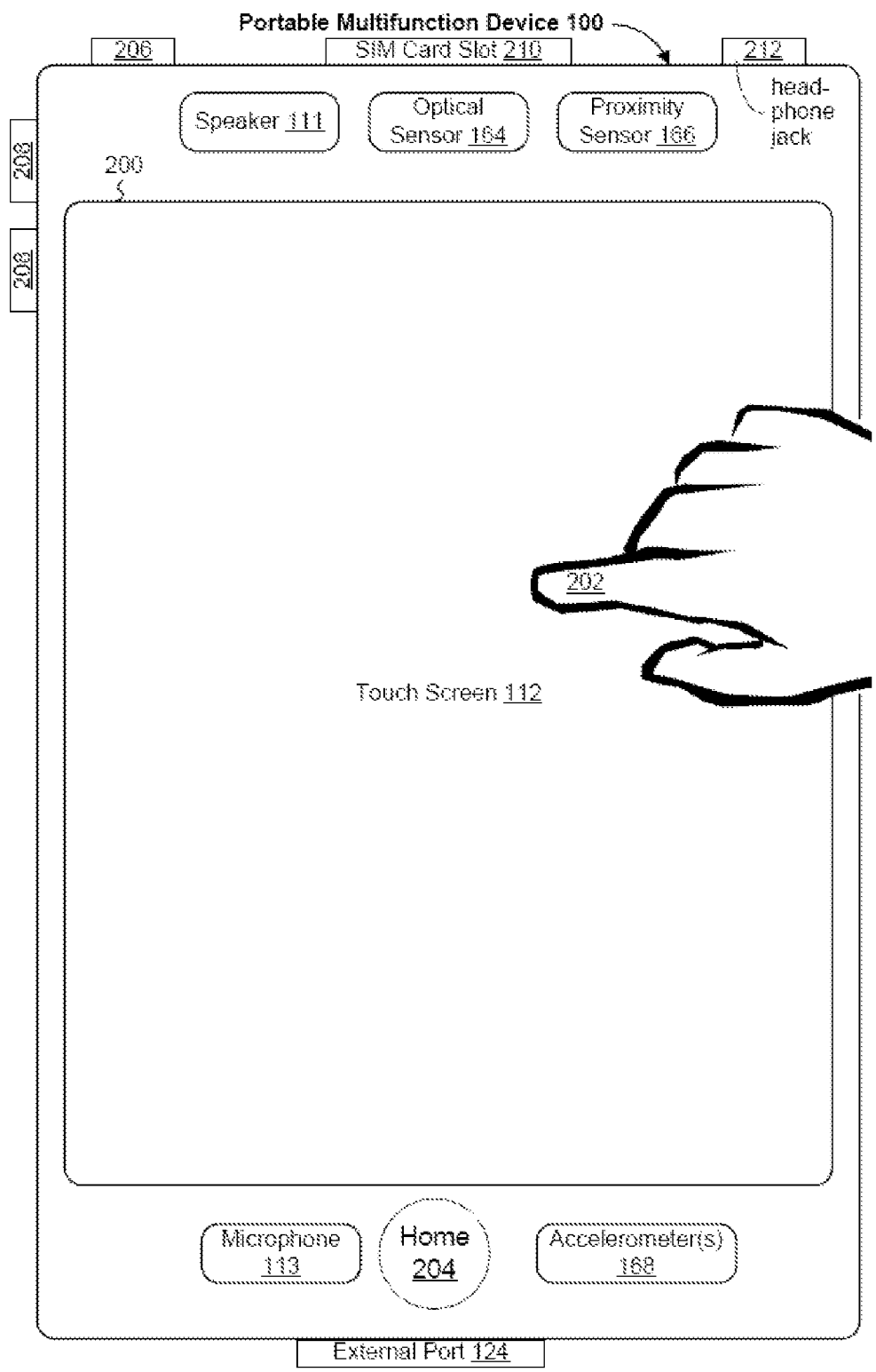
FIG. 2 illustrates a portable multifunction device having a touch screen in accordance with some embodiments.

FIG. 2 illustrates a portable multifunction device 100 having touch screen 112 in accordance with some embodiments. Touch screen 112 can display one or more graphics within user interface (UI) 200. In this embodiment, as well as others described below, a user can select one or more of the graphics by making contact or touching the graphics, for example, with one or more fingers 202 (not drawn to scale in the figure). In some embodiments, selection of one or more graphics occurs when the user breaks contact with the one or more graphics. In some embodiments, the contact can include a gesture, such as one or more taps, one or more swipes (from left to right, right to left, upward and/or downward) and/or a rolling of a finger (from right to left, left to right, upward and/or downward) that has made contact with device 100. In some embodiments, inadvertent contact with a graphic can not select the graphic. For example, a swipe gesture that sweeps over an application icon can not select the corresponding application when the gesture corresponding to selection is a tap.

Device 100 can also include one or more physical buttons, such as "home" or menu button 204. As described previously, menu button 204 can be used to navigate to any application 136 in a set of applications that can be executed on device 100. Alternatively, in some embodiments, menu button 204 can be implemented as a soft key in a GUI in touch screen 112.

In one embodiment, device 100 can include a touch screen 112, a menu button 204, a push button 206 for powering the device on/off and locking device, volume adjustment button(s) 208, a Subscriber Identity Module (SIM) card slot 210, head set jack 212, and docking/charging external port 124. Push button 206 can be used to turn the power on/off on device 100 by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 can also accept verbal input for activation or deactivation of some functions through microphone 113.

Attention is now directed towards methods and systems for selecting text using a multi-touch sensitive device, such as device 100. In general, device 100 can provide a user interface ("UI") that permits easy and quick selection of text displayed on the UI. From time-to-time, description of devices and methods implementing text selection embodiments may be described in terms of being used in a text editing environment, such as when device 100 is running a word processing, email, note pad, instant message, or blogging application, for example. Additionally, features of the embodiments described herein can also be applied in a web browser environment. Description in terms of these exemplary environments is provided to allow the various features and embodiments to be portrayed in the context of exemplary applications. However, this disclosure should not be limited to these specific implementations, but can also be applied in other ways as would be understood by one of skill in the art after reading this disclosure.

Figure 3:
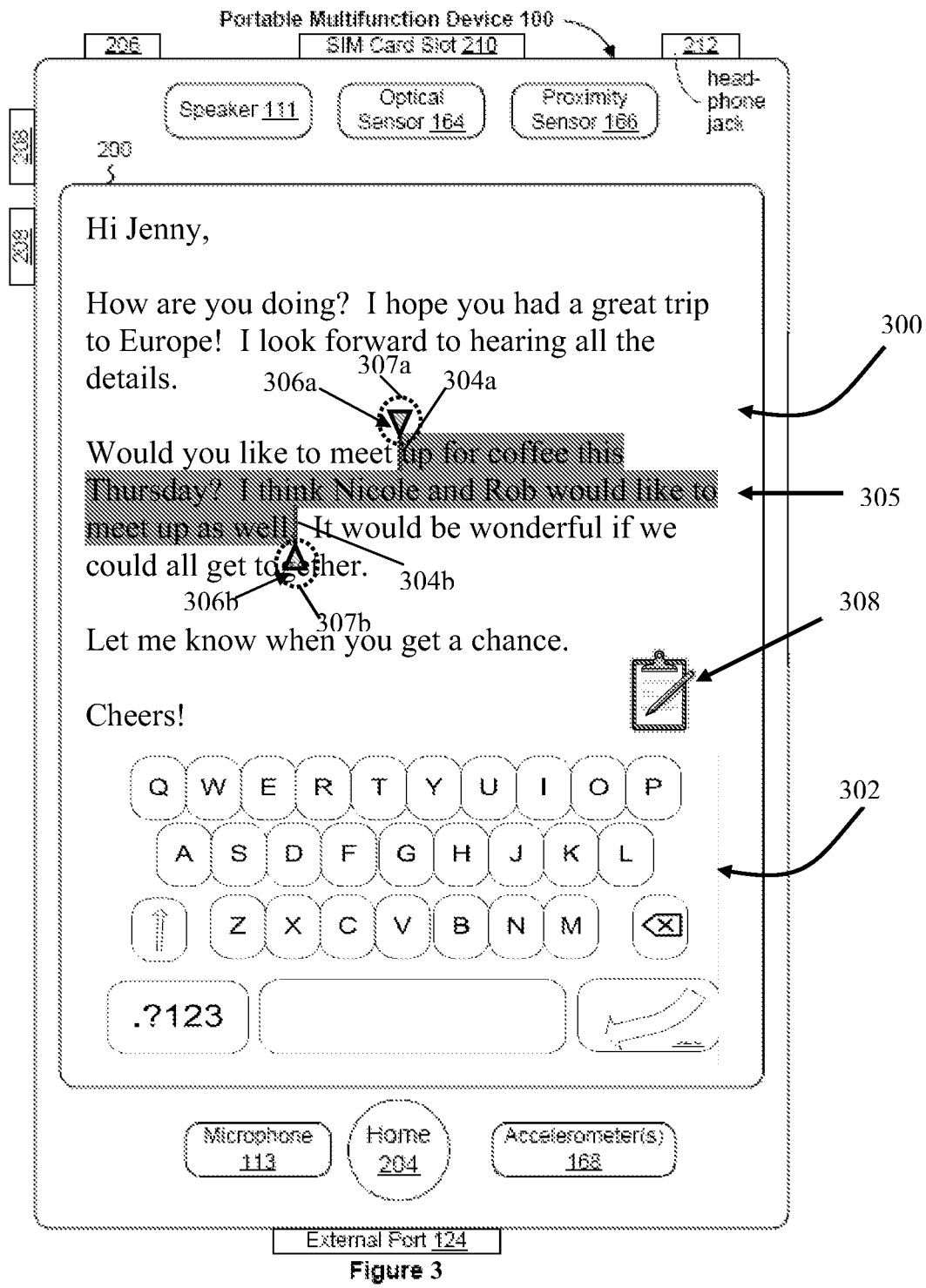
FIG. 3 illustrates an exemplary user interface for inserting a text selection area in accordance with some embodiments.

FIG. 3 illustrates device 100 implementing text selection features in accordance with various embodiments. Here, device 100 is shown with UI in a text editing environment or mode. In such a mode, display screen 200 can display graphics 300 in the form of lines of text and soft keyboard 302 for entering text. Soft keyboard embodiments can include standard (QWERTY) and/or non-standard configurations of symbols on the displayed icons of the keyboard, such as those described in U.S. patent application Ser. No. 11/459,606, "Keyboards For Portable Electronic Devices," filed Jul. 24, 2006, and Ser. No. 11/459,615, "Touch Screen Keyboards For Portable Electronic Devices," filed Jul. 24, 2006, the contents of which are hereby incorporated by reference.

With further reference to FIG. 3, selected text area 305 can be indicated on display 200 as highlighted text bounded by first endpoint 304a and second endpoint 304b. It is understood that selected text area 305 can encompass any portion of the text illustrated in FIG. 3, and the text selected in FIG. 3 is merely one example. Additionally, first endpoint 304a can have an associated first handle 306a and second endpoint can have an associated second handle 306b. As is described in further detail below, handles 306a and 306b can be useful in that they can indicate the location of endpoints 304a and 304b. Handles 306a and 306b can also be used as easily selectable target areas for a user to select in the event a user desires to move one or both of endpoints 304a or 304b. For example, in accordance with various embodiments, a user can move endpoint 304a from its initial location to a second location in text by selecting corresponding handle 306a (e.g., by placing a finger on touch screen display 200 in proximity to handle 304a) and dragging handle 306a (e.g., by moving finger across touch screen display 200) to the second location. In this manner, selected text area 305 can be modified. In some embodiments, handles 306a and 306b can be in the shape of triangles and can be translucent, but, in other embodiments, handles 306a and 306b can be other shapes and sizes, and can be opaque.

In some embodiments, a selectable area for each handle 306a and 306b can be a different size than the visible handle itself. A selectable area for a handle 306 can be referred to herein as a "virtual handle." FIG. 3 shows virtual handles 307a and 307b associated with handles 306a and 306b, respectively. Thus, for example, a user can select handle 306a even if the centroid of a touch does not fall within the visible area of handle 306a, but instead falls within the area of virtual handle 307a. Accordingly, virtual handles 307a and 307b can be larger than or, at least, extend past portions of handles 306a and 306b, respectively, so that the associated handle 306a or 306b is easier for a user to select by providing additional targeting area. The shape of virtual handles 307 can have any shape, such as a circular, an oval, a triangular or a rectangular shape, for example. In some embodiments, the size of virtual handle 307 can be approximately finger-tip sized; whereas, the associated handle 306 can be smaller than the size of a finger tip.

Figure 4:
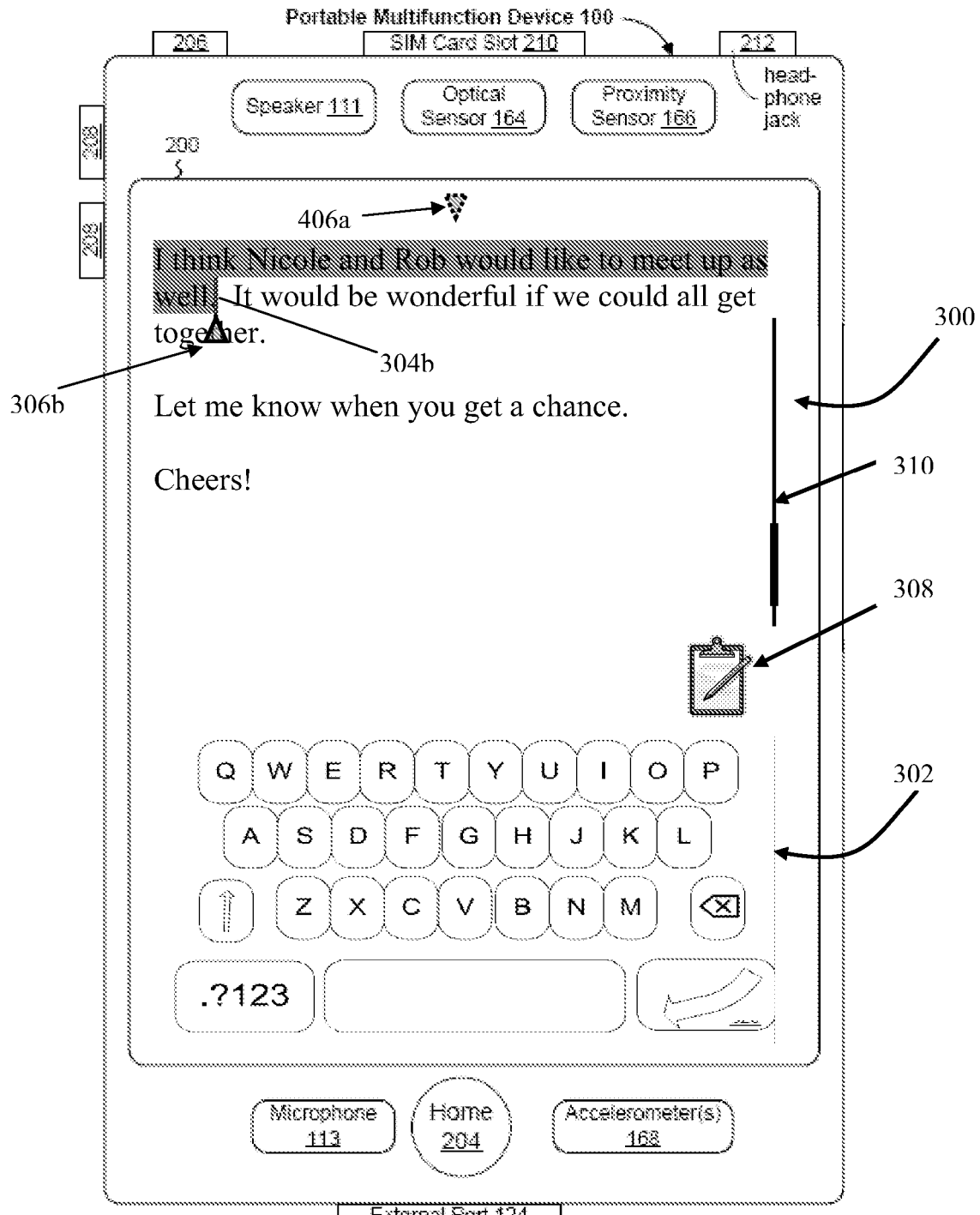
FIG. 4 illustrates an exemplary user interface the device of FIG. 3 having a ghost handle in accordance with some embodiments.

With reference to FIG. 4, ghost handles 406 can be displayed on corners or edges of UI. Ghost handle 406 can correspond to endpoint 304 located off of a viewing area of UI. To illustrate, text can be scrolled downward so that first endpoint 304a is located outside of the display area, for example. Thus, first endpoint 304a is not shown in FIG. 4. Scroll bar 310 can indicate the text is scrolled down. Because first endpoint 304a is off of touch screen 200, ghost handle 406a can be positioned on upper edge of text entry area of device 100 to indicate that first endpoint 304a is located outside of the currently displayed text. In some embodiments, horizontal positioning of ghost handle 406a along the edge of the text viewing area can correspond to the horizontal position of endpoint 304a in the non-displayed text. Accordingly, ghost handle 406a can provide a reference as to the location of first endpoint 304a. Furthermore, in some embodiments, selecting ghost handle 406 can trigger device 100 to display the corresponding endpoint 304 and surrounding text. In other embodiments, a user can grab ghost marker 406 and drag ghost marker 406 to a desired location. A user can cause associated endpoint 304 to be inserted in the location to which the user dragged ghost handle 406.

Further to FIG. 3, text selection icon 308 can also be provided in UI in accordance with various embodiments. Text selection icon 308 can be used to initiate a text selection mode and can be displayed in the form of a clipboard. For example, in accordance with an embodiment, a user can tap text selection icon 308 to initiate a text selection mode. Thereafter, the user can tap touch screen display 200 at a desired location to insert first endpoint 304a in text and then tap touch screen display 200 at a second location to insert second endpoint 304b in text. Any text located between endpoints 304a and 304b can then be highlighted to indicate the currently selected text area 305. This is discussed in more detail below with reference to FIGS. 10a and 10b. In addition, once text is selected, the user can drag and drop the selected text into text selection icon 308. That text can be later accessed by the user and copied or pasted into a different location in a document or different document entirely, for example.

Figure 5:
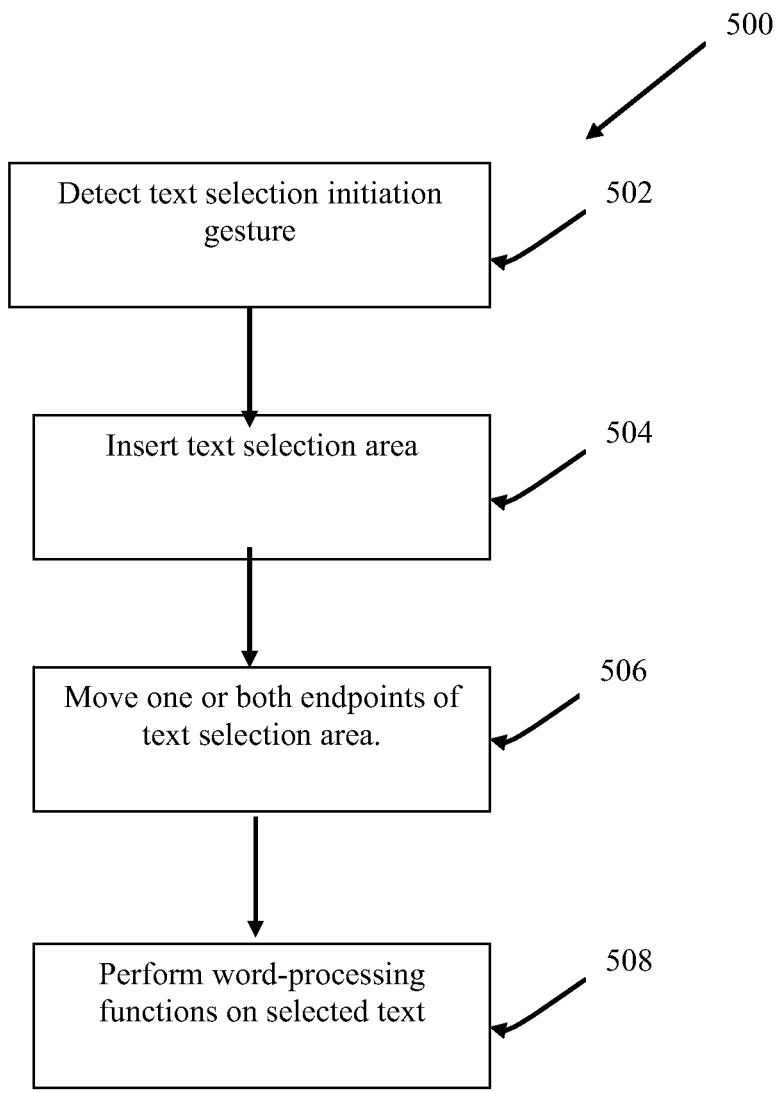
FIG. 5 is a flow diagram illustrating an exemplary process for selecting text using gestures in accordance with some embodiments.

FIG. 5 is a flow diagram illustrating an exemplary process 500 for selecting text in accordance with some embodiments. As mentioned above, process 500 can be used while device 100 is in a text editing mode, but need not be. For example, process 500 can be used while in a web browser mode.

In step 502, process 500 can begin when a text selection initiation gesture is detected by device 100. In accordance with various embodiments, a text selection initiation gesture need not be limited to a particular gesture, as various types of gestures can be used. The following is a non-limiting list of exemplary gestures that can be used to initiate text selection in accordance with various embodiments:

(1) Touching and holding two fingers on touch screen 200 for a predetermined amount of time (e.g., 2 seconds). The fingers can be spread apart, or the fingers can be together.
(2) Placing two fingers on touch screen display and then spreading the fingers apart.
(3) A double finger tap on touch screen 200.
(4) Selecting text selection icon 308 (shown in FIG. 4).
(5) A horizontal slide of two fingers across a portion of display panel 200.
(6) A text selection mode can be initiated by first initiating a text marker insertion mode and than performing a further gesture. As an example, a text selection initiation gesture can be a horizontal slide of one finger, which can enter insertion marker placement mode. Insertion marker placement mode is discussed in more detail in U.S. patent application Ser. No. 11/965,570, "Insertion Marker Placement On Touch Sensitive Display," filed Dec. 27, 2007, the contents of which are hereby incorporated by reference in its entirety. Device 100 can then enter text selection mode by a touch of a second finger on the touch panel 200 once device 100 is in insertion marker placement mode.

Of course, text selection initiation gestures need not be limited those described herein, as others can be used. Furthermore, various embodiments can use one or more different text selection initiation gestures, and need not be limited to a single gesture.

Next, in step 504, endpoints 304a and 304b can be inserted in text. In some embodiments, endpoints 304 can be inserted into text in accordance with the particular gesture used to initiate text selection. Various gestures used to initiate text selection and resulting endpoint insertion locations are discussed below with reference to FIGS. 6-10.

Figure 6A:
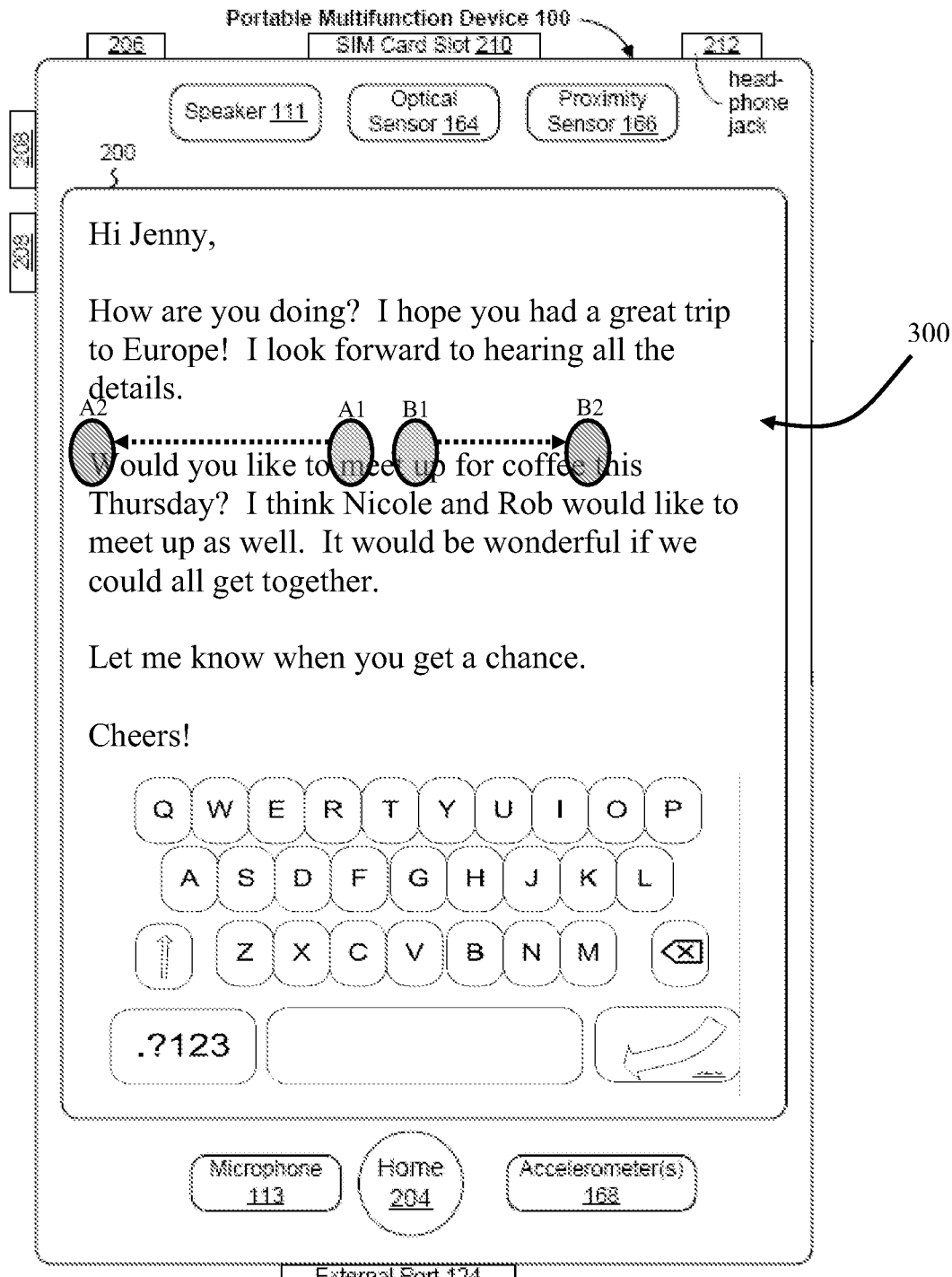
FIGS. 6a and 6b illustrate an exemplary text selection initiation gesture in accordance with some embodiments.
Figure 6B:
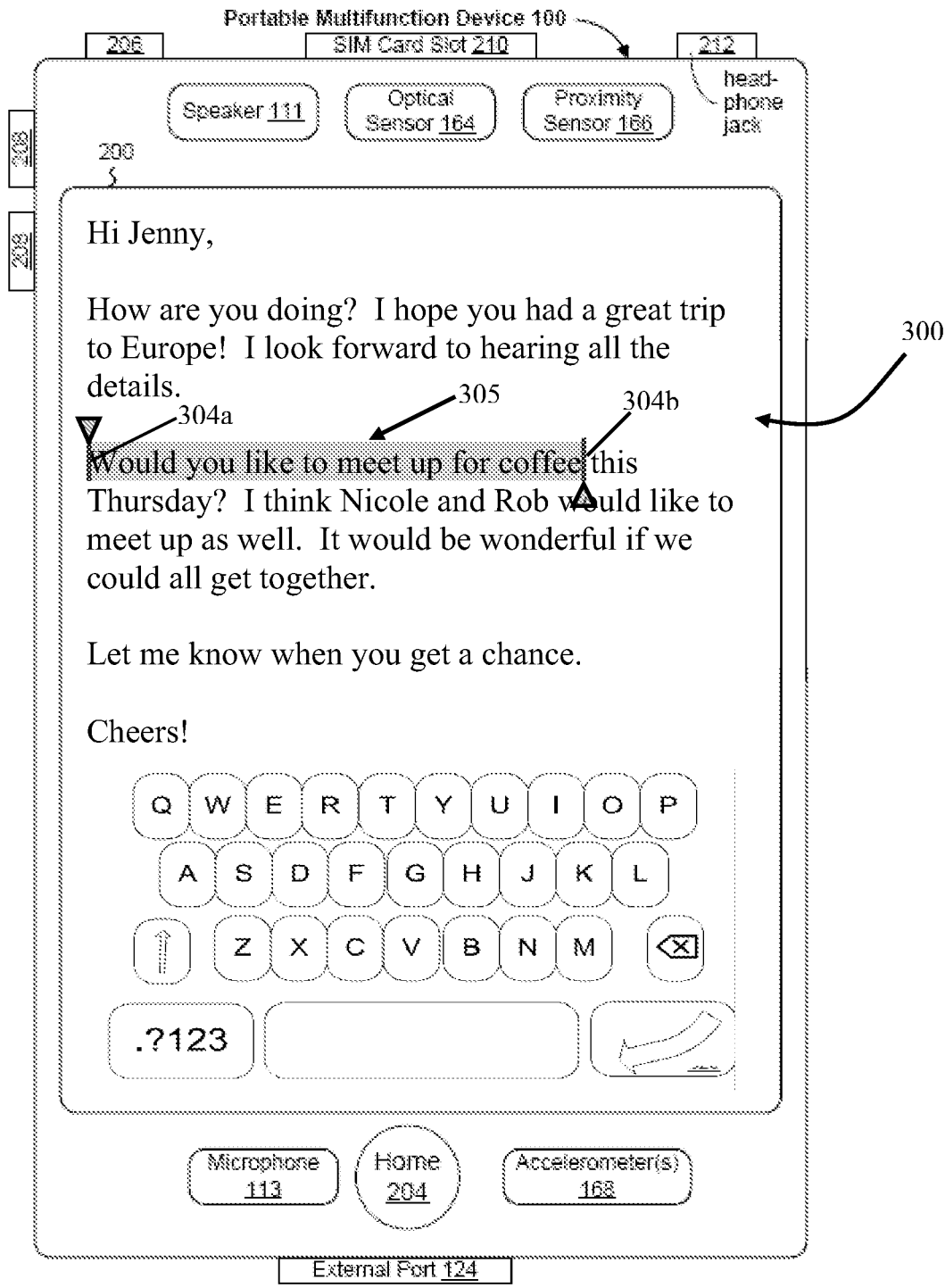

As an example, a text selection initiation gesture can include spreading apart a first finger and a second finger on touch screen 200. To illustrate, FIG. 6a shows an exemplary detected finger spreading-apart gesture. Detected beginning and ending finger contact areas of a first finger are illustrated as areas A1 and A2, respectively. Detected beginning and ending finger contact areas of a second finger are illustrated as areas B1 and B2, respectively. Dashed arrows indicate the direction of the detected finger movement across touch screen 200. Thus, FIG. 6a shows initial detection of the first finger at area A1 and subsequent detection of the first finger moving to area A2, and initial detection of second finger at area B1 and subsequent detection of the second finger moving to area B2. Resulting ending locations of the fingers A2 and B2 can then designate locations where endpoints 304a and 304b, respectively, of text selection area 305 are inserted in text 300. For example, FIG. 6b illustrates the placement of first endpoint 304a at or near area A2 and the placement of second endpoint 304b at or near area B2.

Figure 7A:
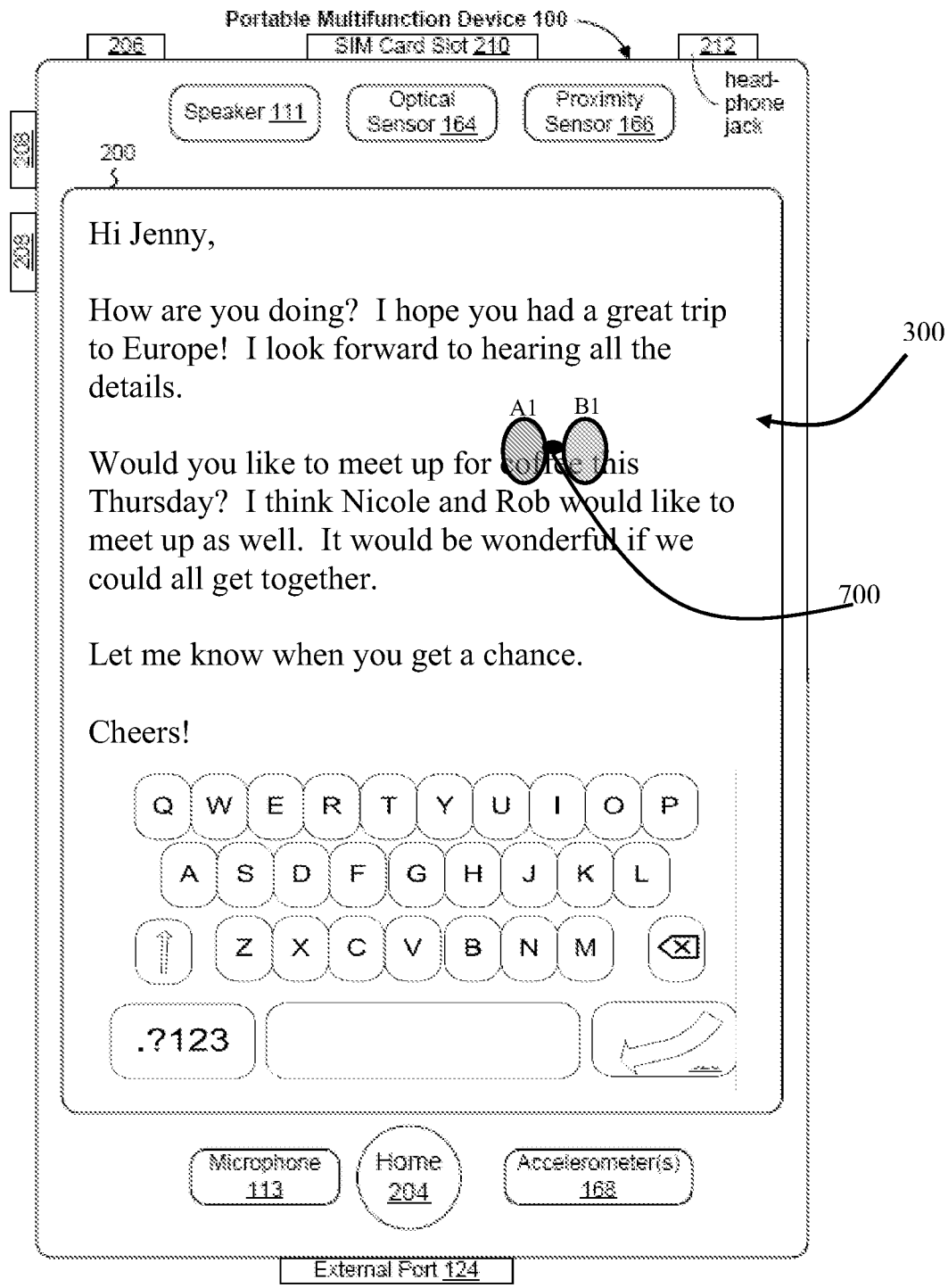
FIGS. 7a and 7b illustrate another exemplary text selection initiation gesture in accordance with some embodiments.
Figure 7B:
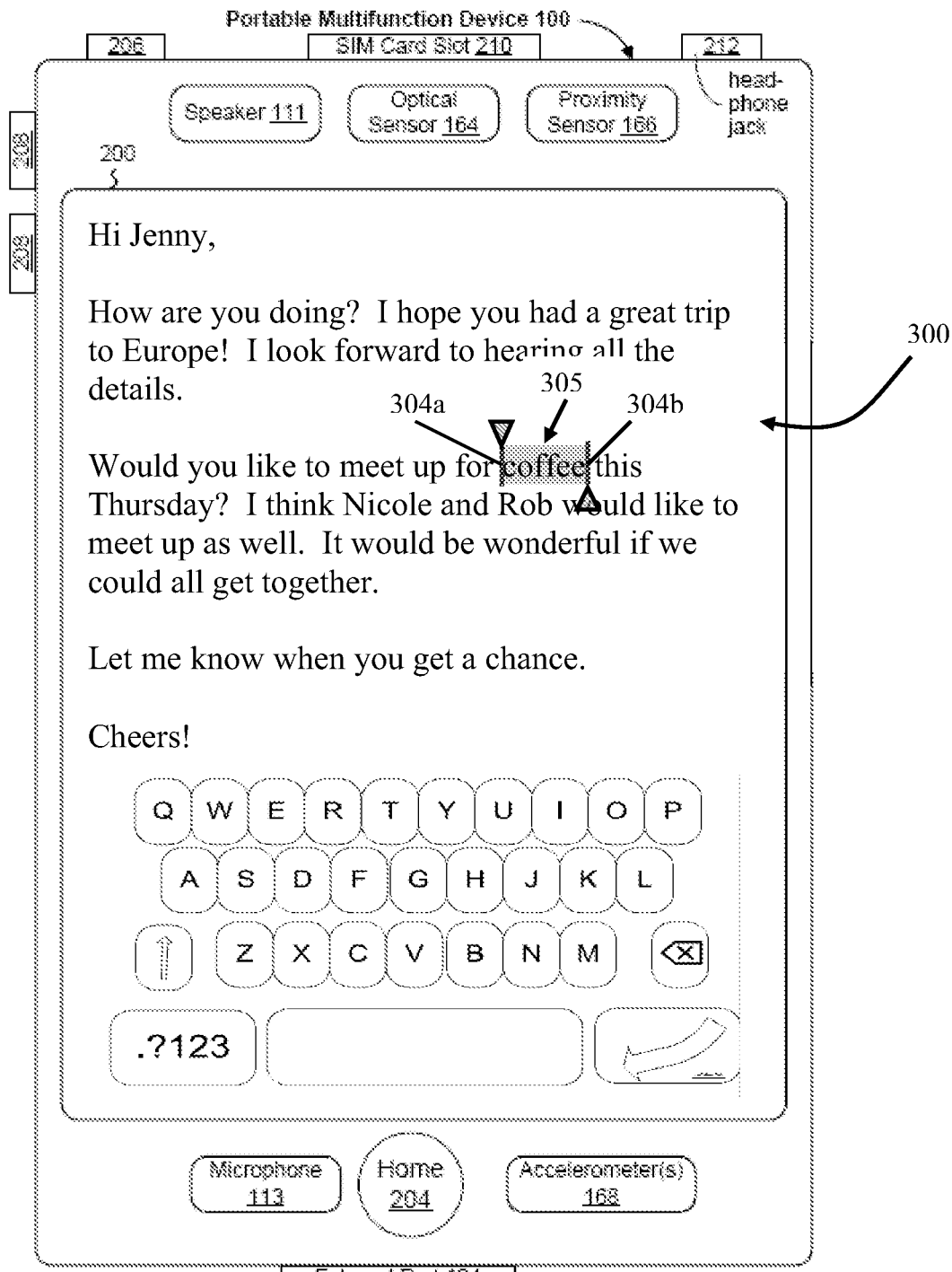

As another example, FIG. 7a illustrates a text selection initiation gesture that can include detecting two fingers placed and held at locations A1 and B1 on the touch screen 200 for a predetermined amount of time without moving the fingers. FIG. 7b illustrates resulting insertion locations of endpoints 304a and 304b as the beginning and end of a word located proximate a centroid 700 (represented as a dot between detected finger contact areas A1 and B1 in FIG. 7) of the detected the finger touch locations A1 and B1.

Figure 8A:
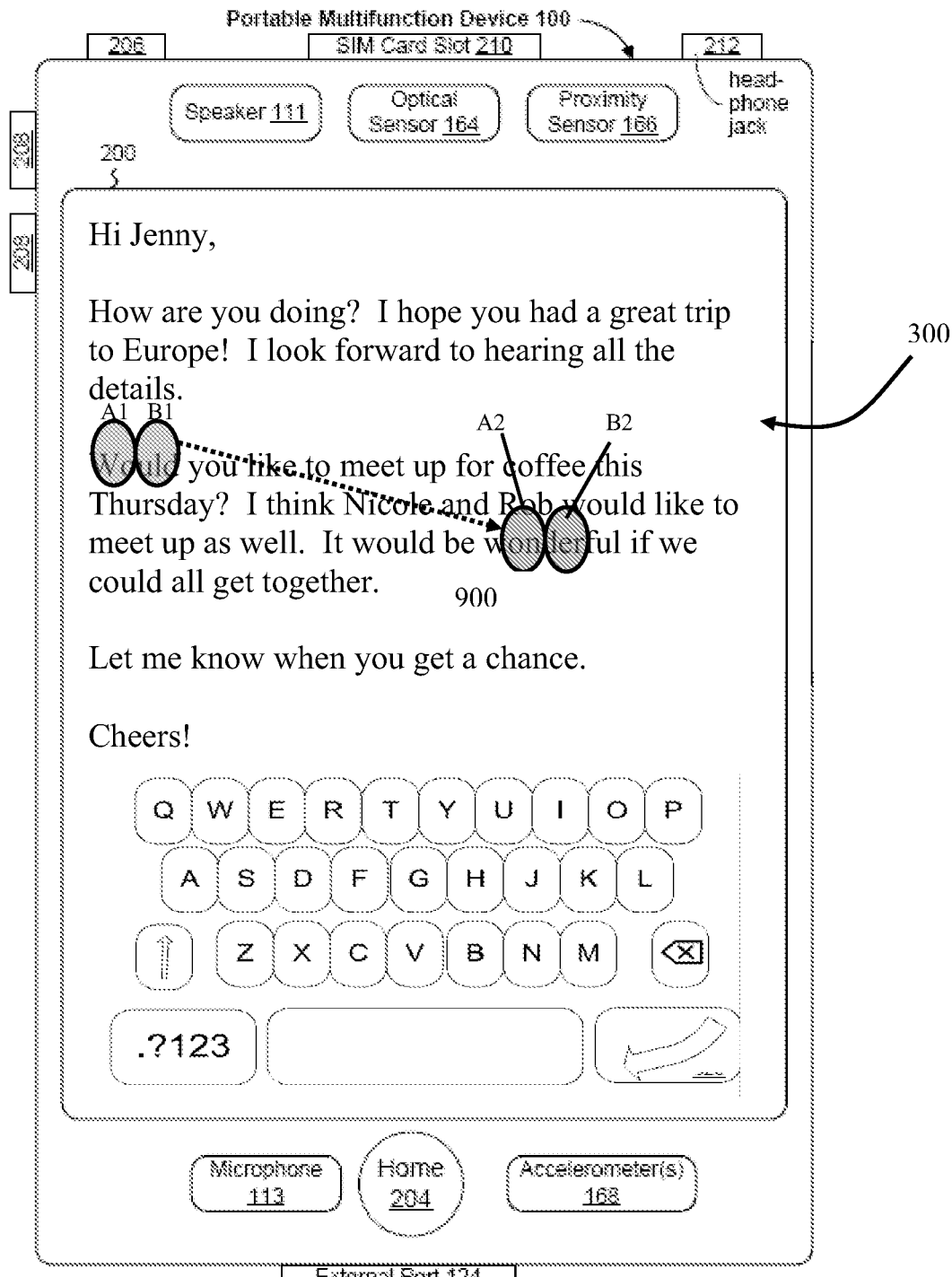
FIGS. 8a and 8b illustrate a further exemplary text selection initiation gesture in accordance with some embodiments.
Figure 8B:
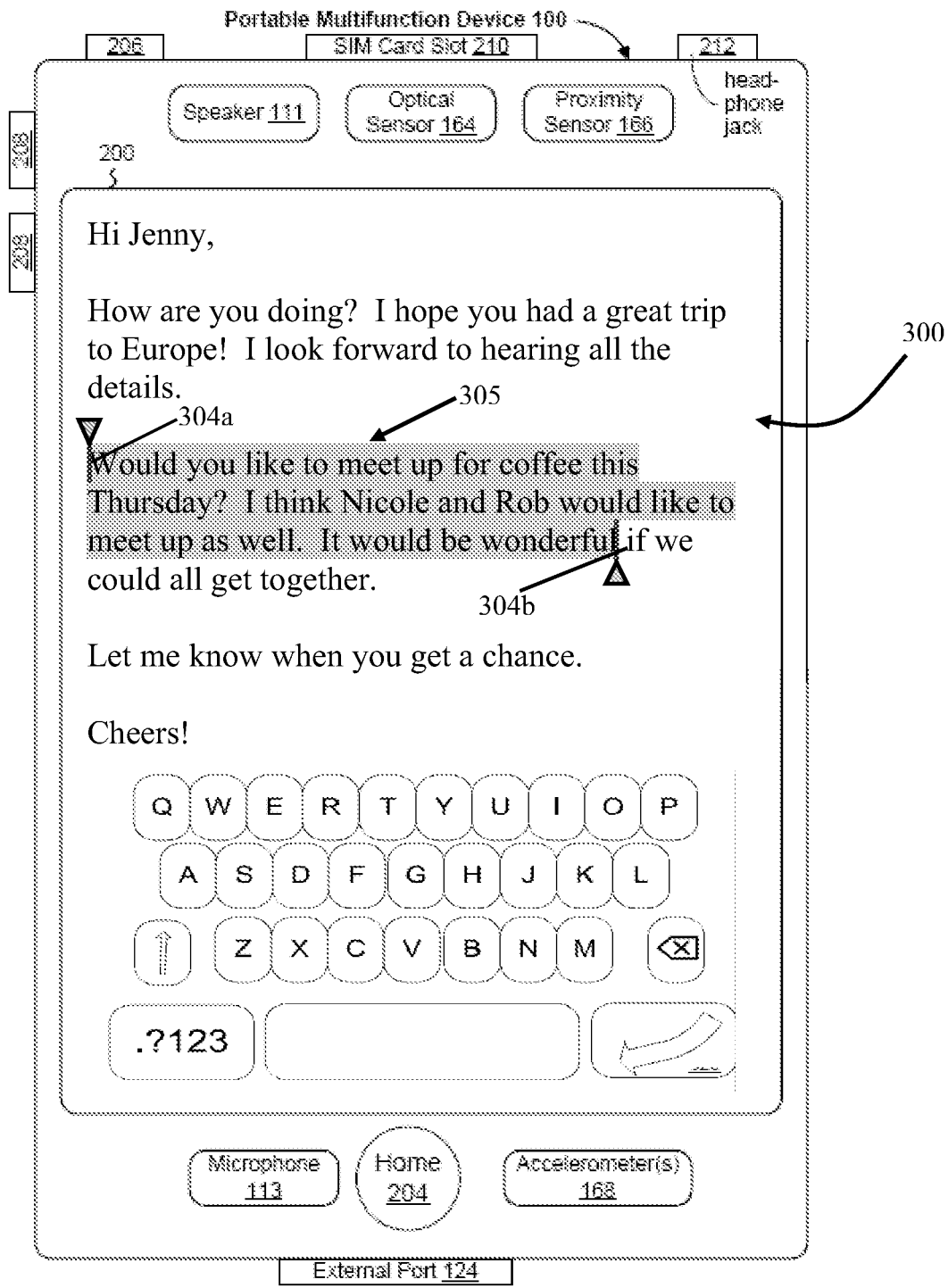

Alternatively, when using two fingers, first endpoint 304a can be placed at an end of or inside a word located proximate the two finger contact, and subsequent sliding of the two fingers across touch screen 200 to a second location can determine the position of second endpoint 304b. Exemplary detection of such a gesture is illustrated in FIG. 8a and the resulting text selection area 305 and endpoints 304a and 304b are illustrated in FIG. 8b. In accordance with various embodiments, insertion and movement of text endpoints can be performed in a similar manner to that of movement of insertion markers, which is described in previously referenced in U.S. patent application Ser. No. 11/965,570, "Insertion Marker Placement On Touch Sensitive Display," filed Dec. 27, 2007, the contents of which are hereby incorporated by reference again in their entirety.

Figure 9A:
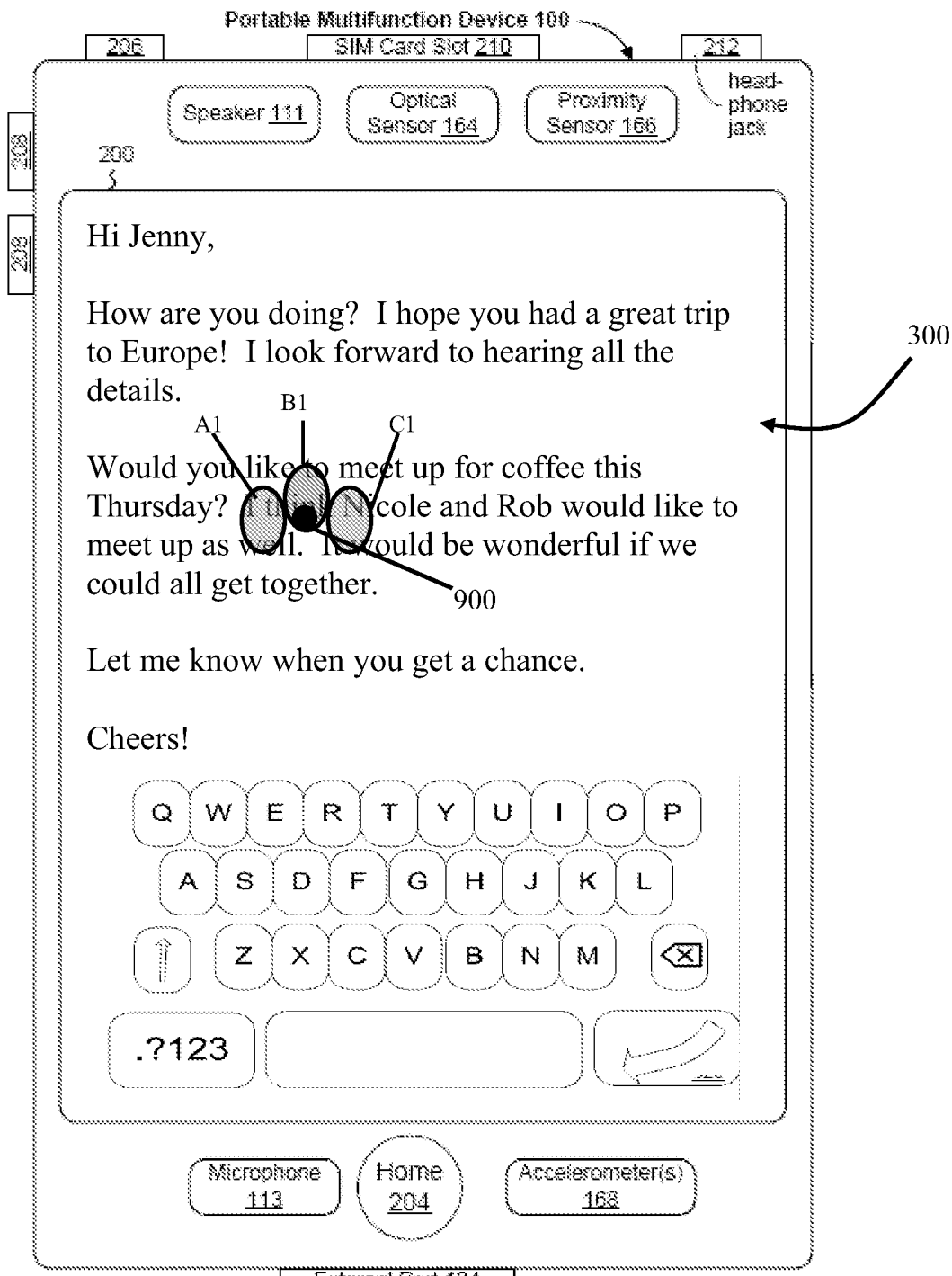
FIGS. 9a and 9b illustrate yet another exemplary text selection initiation gesture in accordance with some embodiments.
Figure 9B:
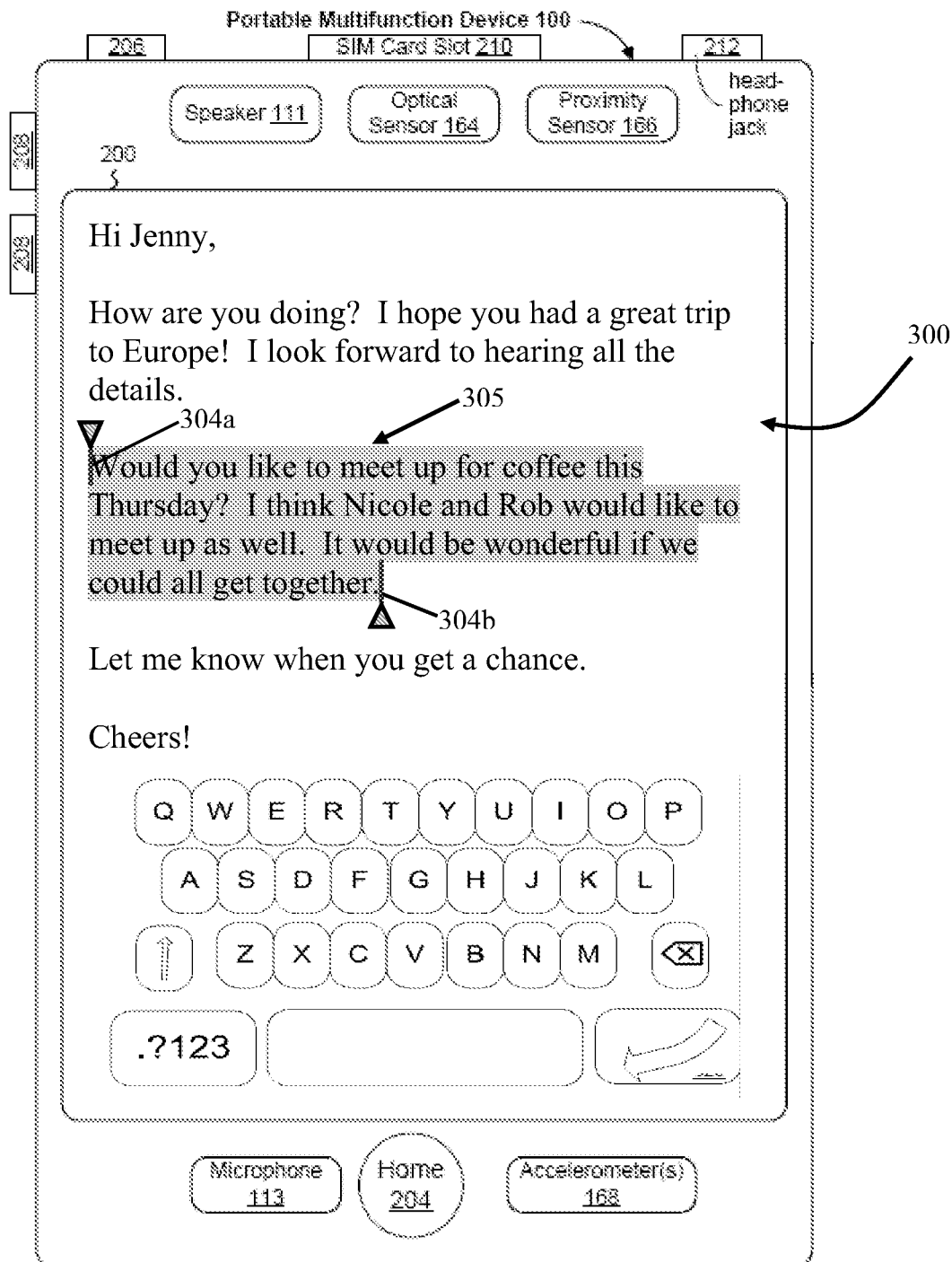

As yet another example, a further text selection initiation gesture comprising placing and holding three fingers on touch screen 200 is illustrated in FIGS. 9a and 9b. As shown in FIG. 9a, device 100 can detect finger contacts areas A1, B1 and C1 of respective first, second and third fingers on touch screen 200. In response, text selection area 305 can be a paragraph or sentence located under centroid 900 of finger contact areas A1, B1 and C1. FIG. 9b illustrates the resulting selection area 305 as including the entire paragraph located under centroid 900; although, as mentioned above, the selection area 305 could encompass a single sentence falling under or proximate to centroid 900 in other embodiments.

Figure 10A:
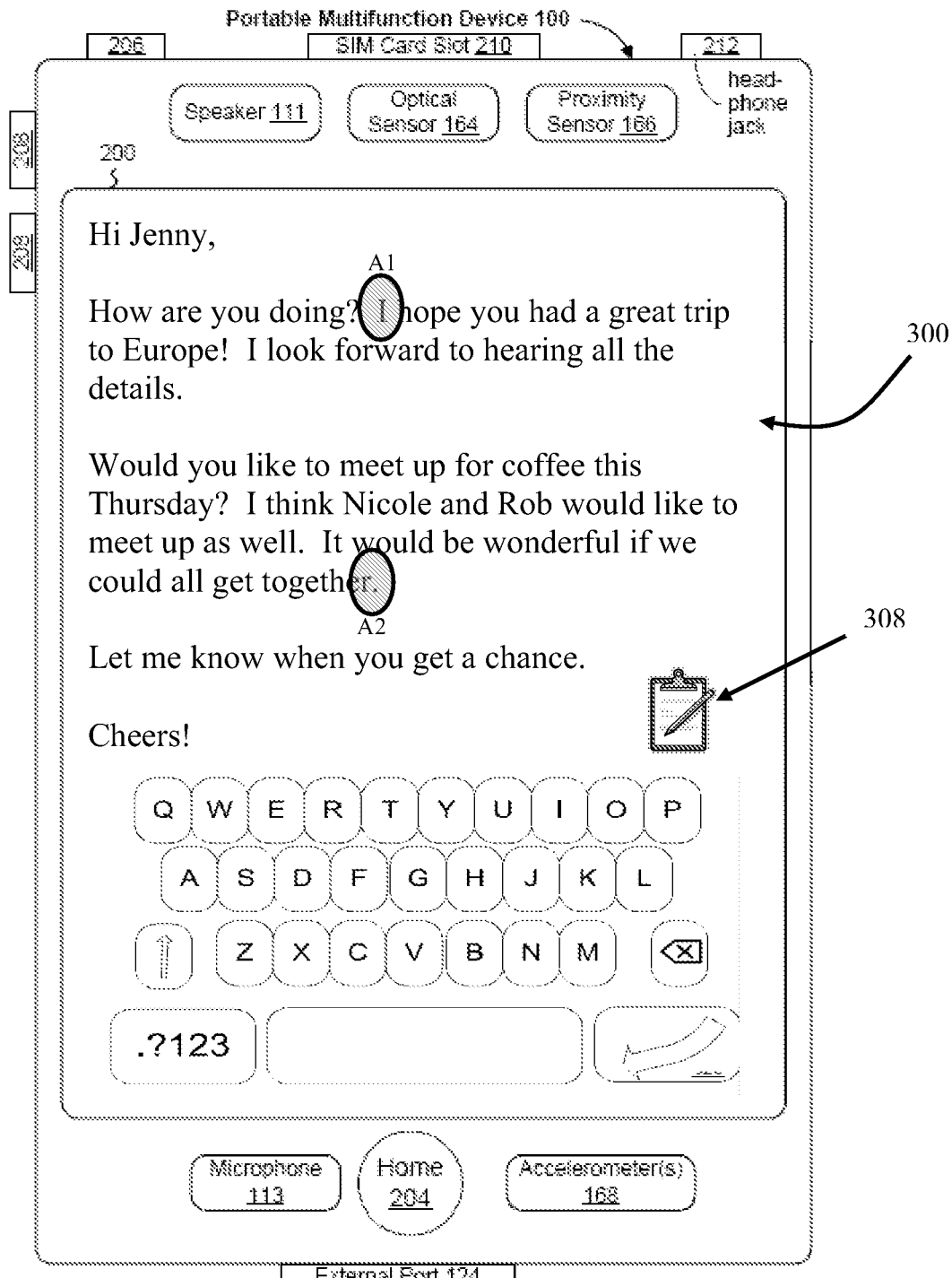
FIGS. 10a and 10b illustrate an exemplary initiation of text selection using a text selection icon in accordance with some embodiments.
Figure 10B:
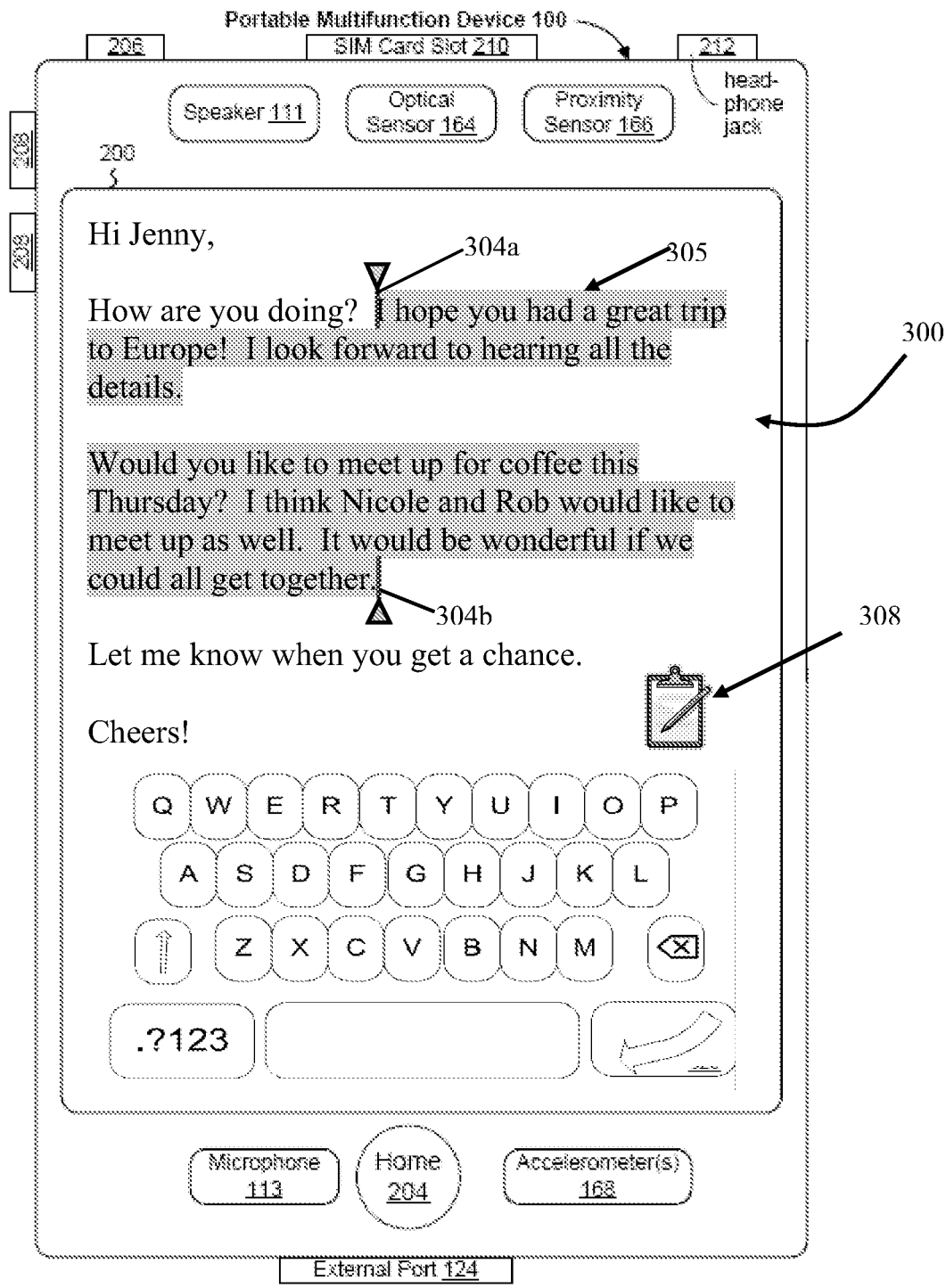

An exemplary text selection initiation gesture using text selection icon 308 is described with reference to FIGS. 10a and 10b. First, a user can select text selection initiation icon 308 by, for example, tapping the text selection icon 308 with a finger. Next, as shown in FIG. 10a, the user can tap over a first location of text 300, which can be detected as finger contact A1, to insert first endpoint 304a and tap over a second location of text 300, detected as finger contact B1, to insert second endpoint 304b. As illustrated in FIG. 10b, endpoints 304a and 304b can then be inserted proximate to respective locations of detected first and second taps A1 and B1.

Figure 11A:
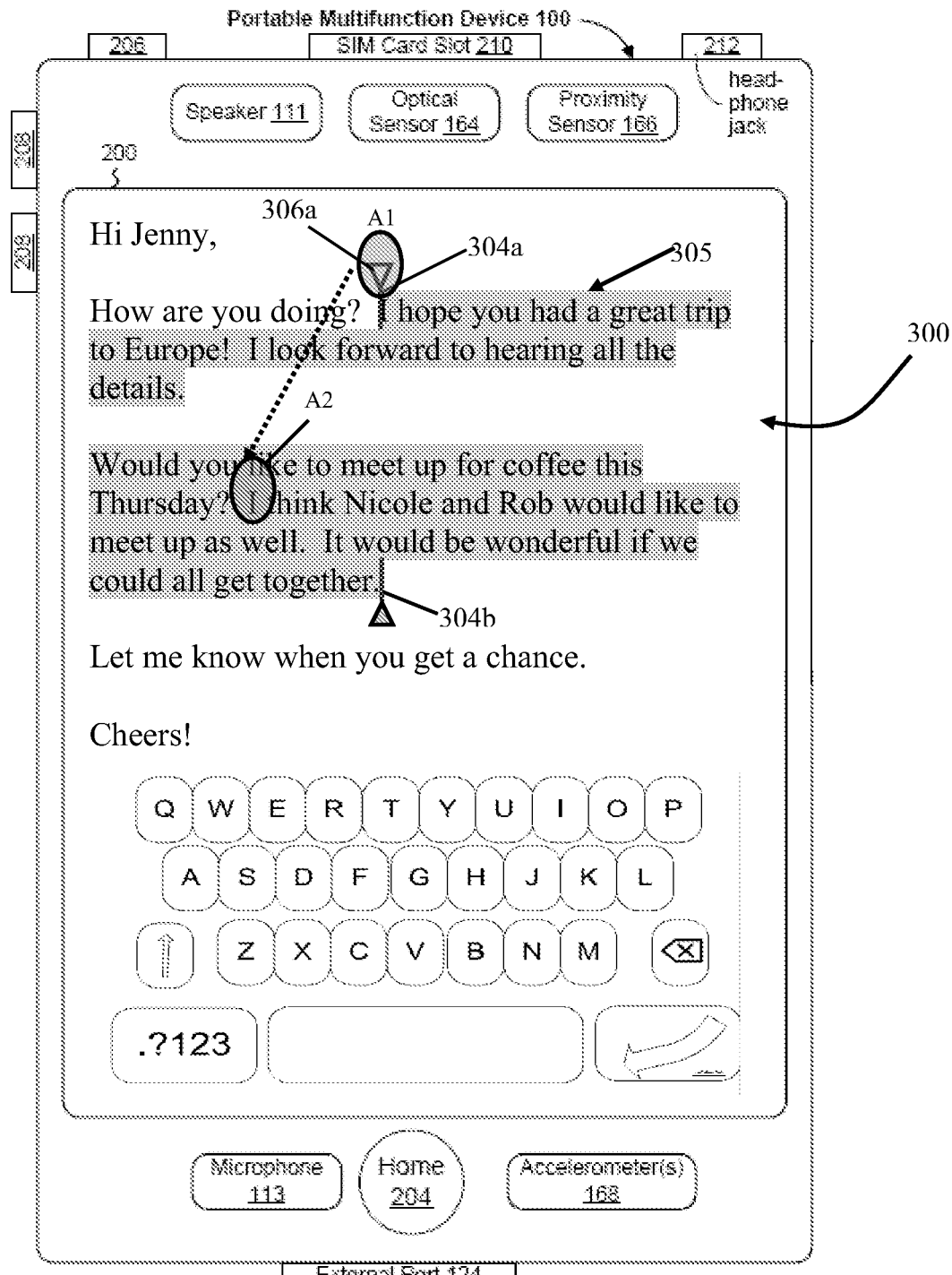
FIGS. 11a and 11b illustrate an exemplary procedure for changing the location of endpoints of a text selection area in accordance with some embodiments.
Figure 11B:
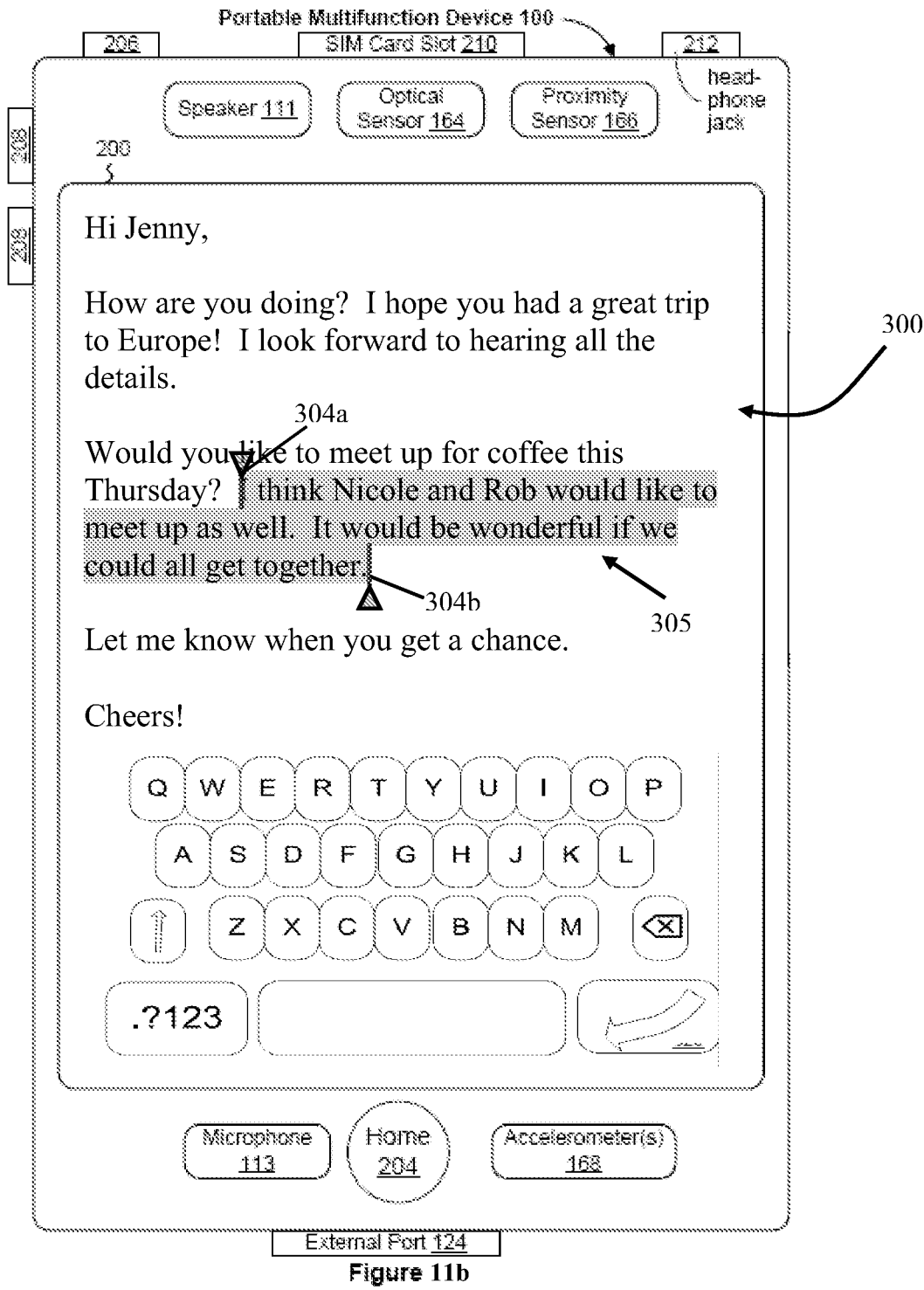

After initial placement of endpoints 304a and 304b, endpoints 304a and 304b can be moved to new locations in step 506. In accordance with some embodiments, a user can move endpoint 304a or 304b by first selecting its corresponding handle 306a or 306b and then dragging handle 306a or 306b over touch screen 200 to a new, desired location. An example of a user selecting handle 304b and dragging handle 304b to a new location is described with reference to FIG. 11. As illustrated, a user can tap handle 304b to select handle 304b. The detected finger tap is represented finger contact area A1. The user can then slide a finger across touch screen 200 (indicated as a dashed arrow) to a second location, illustrated as detected finger contact area A2. FIG. 11b illustrates endpoint 304a moved to its second location in text 305.

Figure 12A:
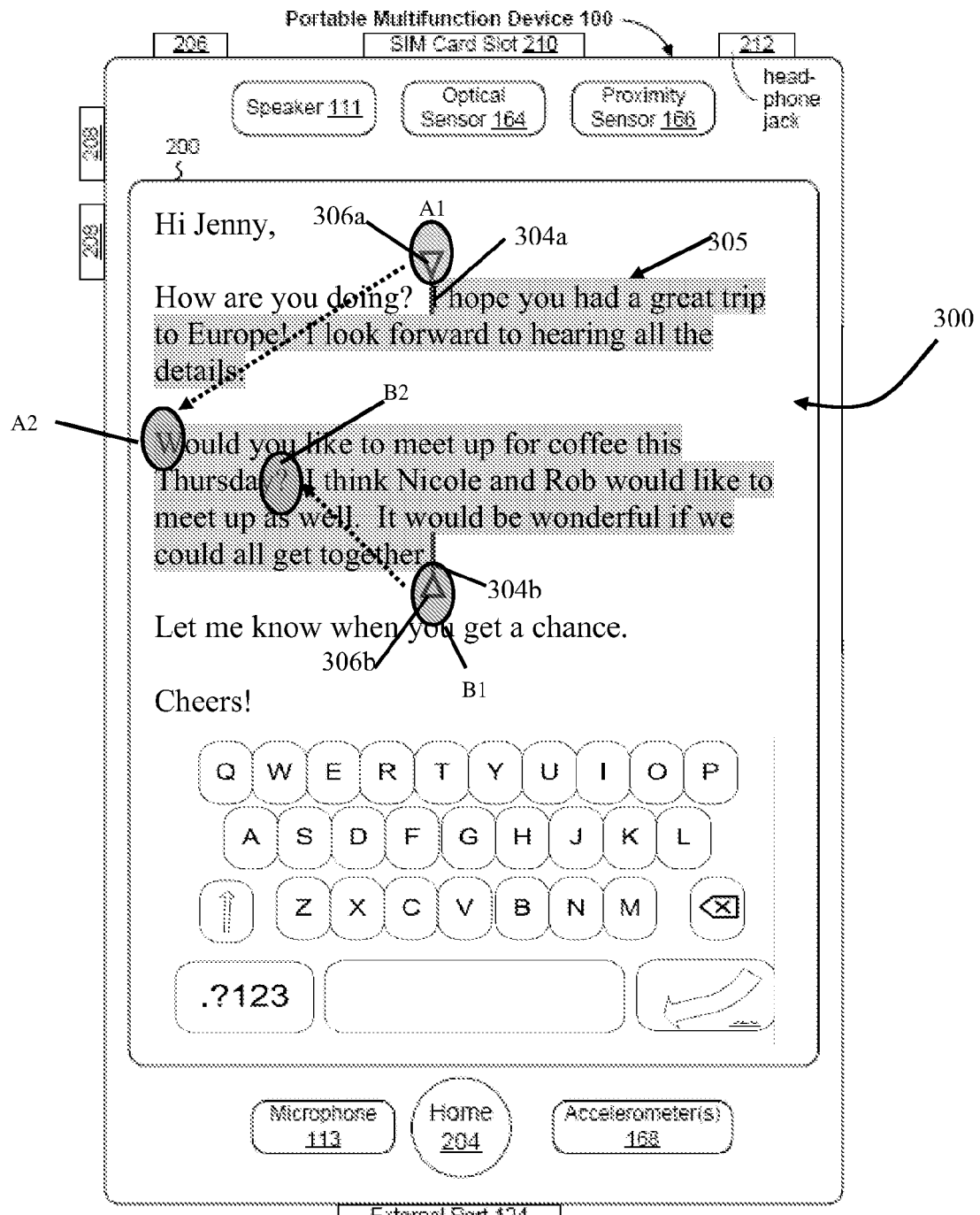
FIGS. 12a and 12b illustrate another exemplary procedure for changing the location of endpoints of a text selection area in accordance with some embodiments.
Figure 12B:
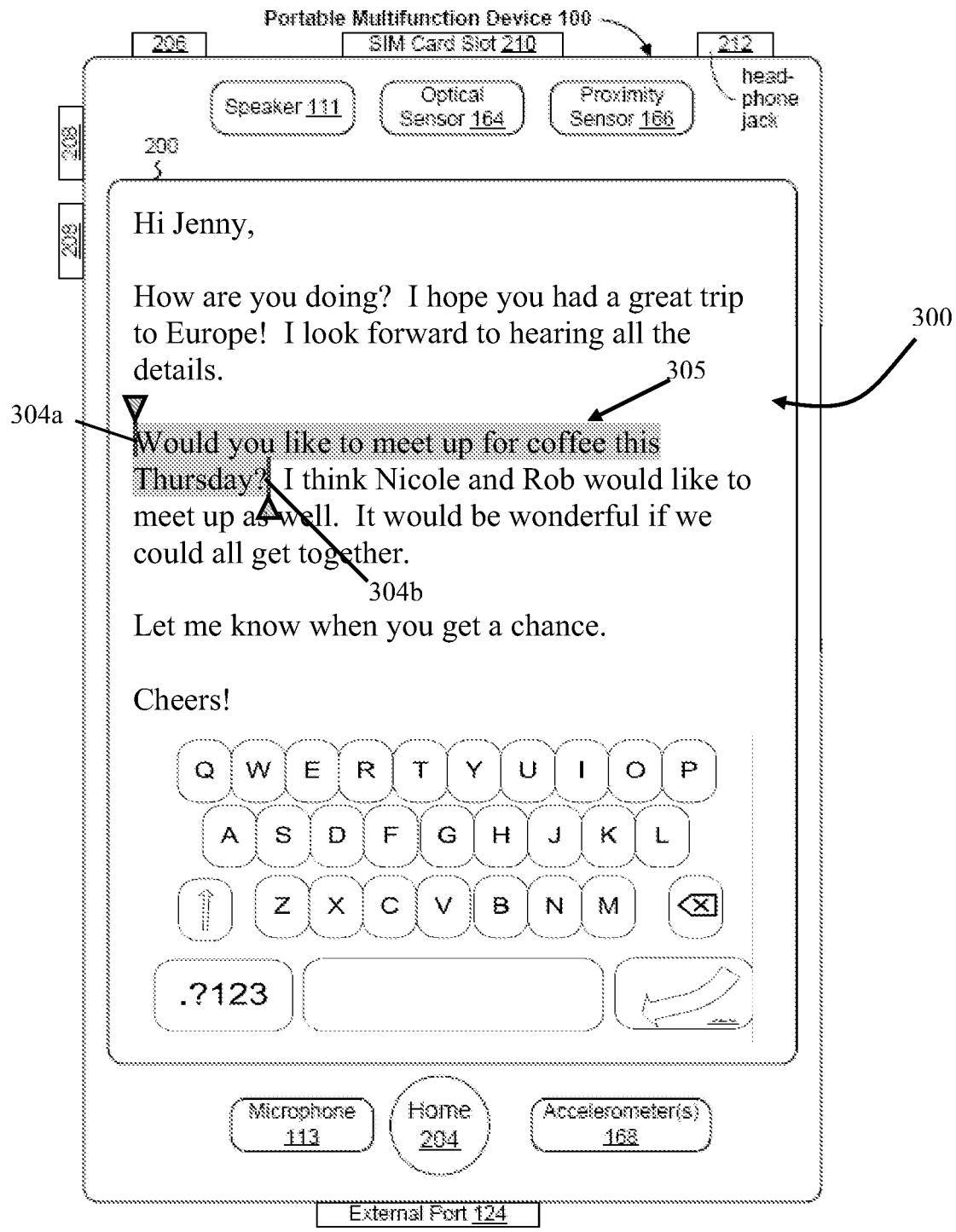

In some embodiments, both endpoints 304a and 304b can be selected at the same time and moved simultaneously or concurrently. For example, with reference to FIG. 12a, a user can associate first endpoint 304a with a first finger by placing the first finger over handle 306a (represented as finger contact A1), and associate second endpoint 304b with a second finger by placing the second finger over handle 306b (represented as finger contact area B1). FIG. 12a also illustrates the user sliding first and second fingers across touch screen 200, in accordance with the respective directions of dashed arrows, to new locations in text 300 corresponding to respective detected finger areas A2 and B2. The user can slide each finger at the same time, if desired. FIG. 12b illustrates selected text area 305 after endpoints 304a and 304b have been moved to their new locations in text 300.

Figure 13A:
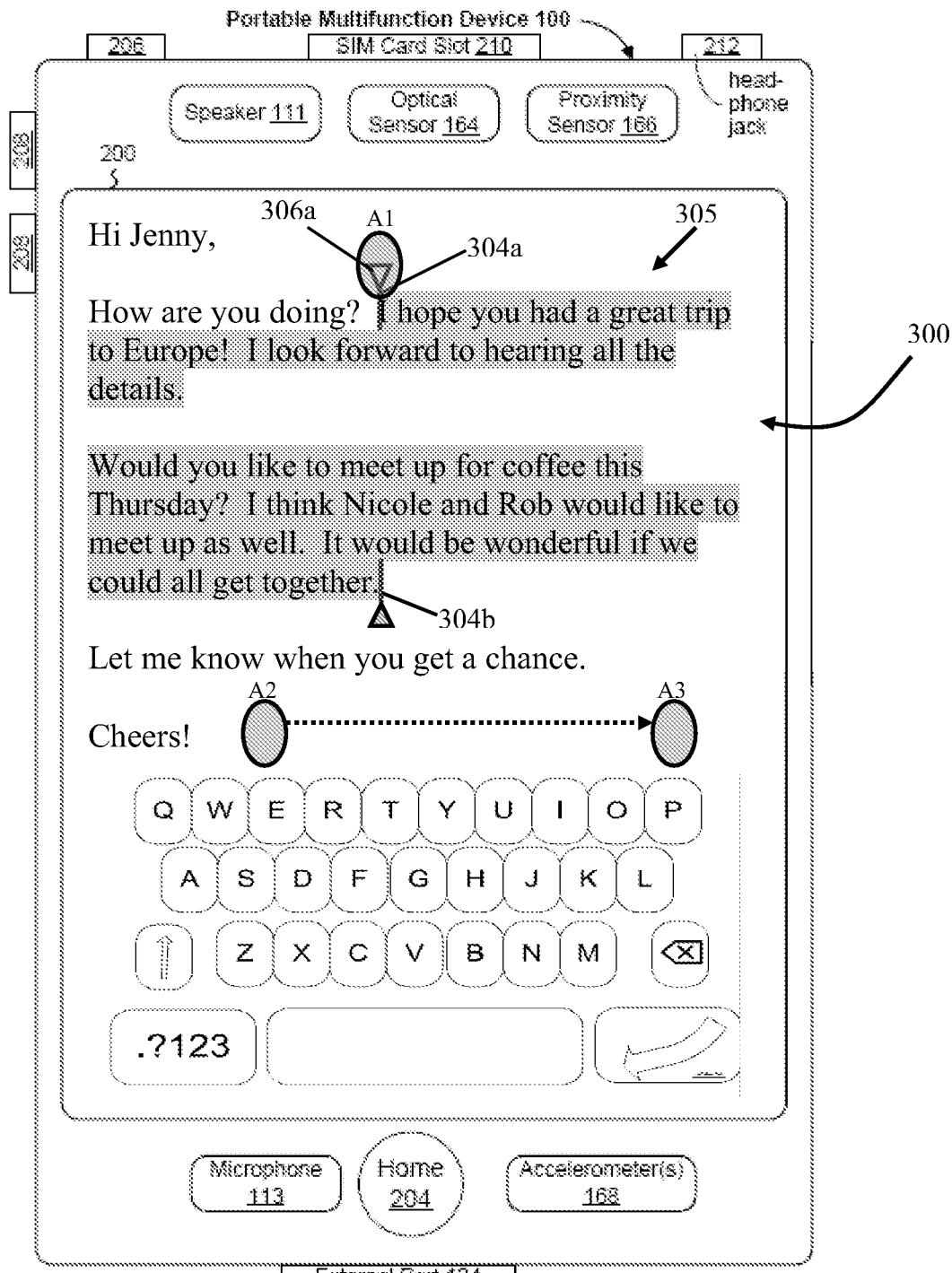
FIGS. 13a and 13b illustrate a further exemplary procedure for changing the location of endpoints of a text selection area in accordance with some embodiments.
Figure 13B:
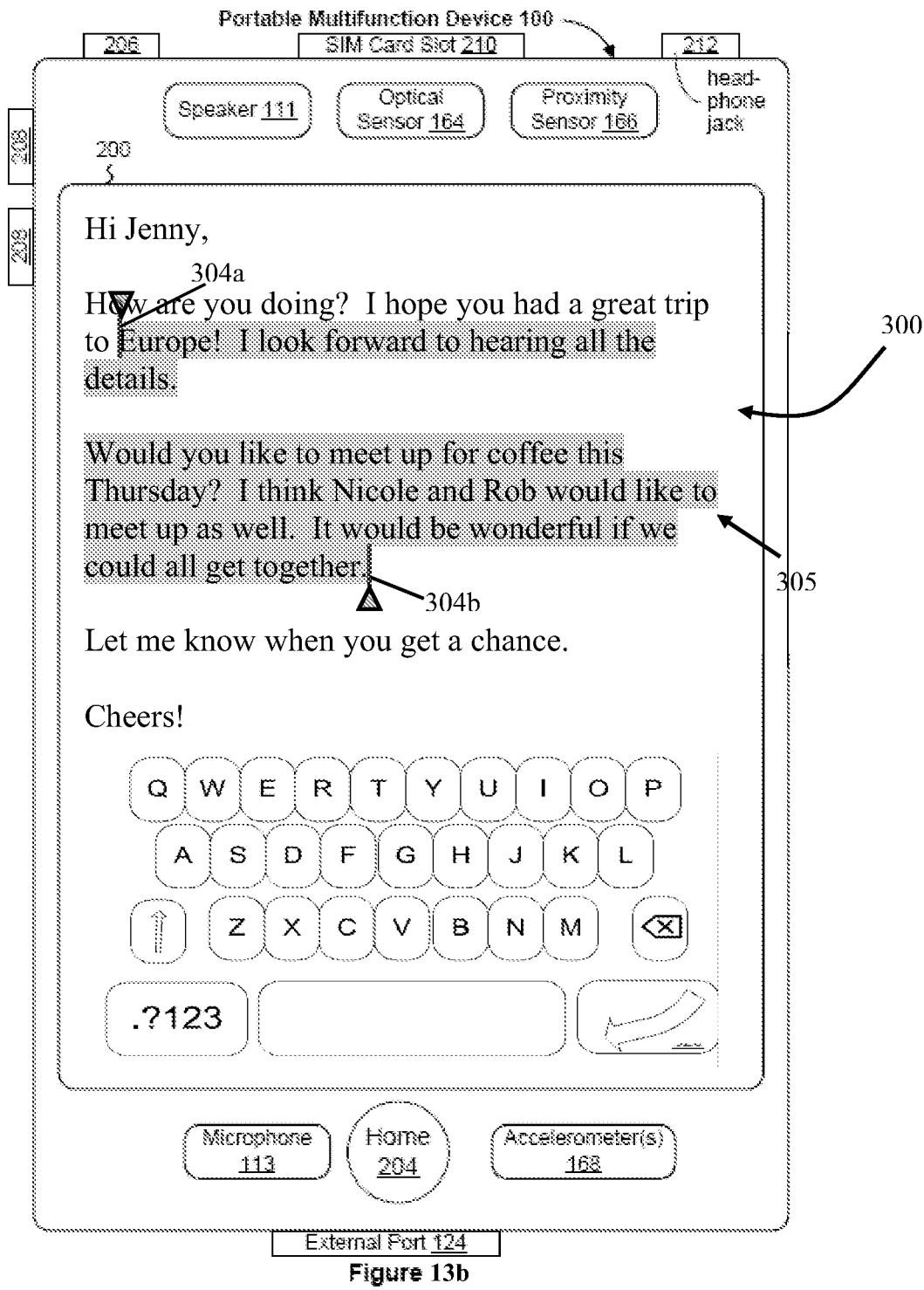

The finger movement detected in step 506 can also be performed on a portion of touch screen 200 that is located remote from handle 306 or endpoint 304 being moved. In other words, using a finger associated with one of endpoints 304a or 304b, a user can move the endpoint 304a or 304b by swiping touch screen 200 sideways (e.g., horizontally) on a portion of touch screen 200 located remote from associated endpoint 304a or 304b or handle 306a or 306b. The swipe can cause associated endpoint 304a or 304b to move in accordance with the direction and magnitude of the detected swipe. Permitting finger movement in step 508 remote from associated endpoint 304a or 306b and handle 306a or 306b can allow a user to move endpoint 304a or 304b without obstructing the view of associated endpoint 304a or 304b and can require less precise finger targeting. FIGS. 13a and 13b illustrate an exemplary process of moving first endpoint 304a in such a manner. As an initial step, endpoint 304a can be selected by tapping its associated handle 306a (represented as detected contact area A1). Next, a user can swipe a finger across touch screen 200 remote from endpoint 304a and 306a, which, in the example shown in FIG. 13a, can start at detected contact point A2 and end at detected contact point A3. FIG. 13b illustrates endpoint 304a moving from its initial location to a second location in text 300 in response to the swipe. In some embodiments, movement of endpoint 304a can be in accordance (e.g., proportion) with the direction and magnitude of the detected finger swipe. Furthermore, endpoint 304a or 304b can scroll along a line of text and continue scrolling along a following line of text. Also, after the first swipe, a user can perform additional swipes to move endpoint 304a or 304b further along the lines of text.

Various ways can be used to associate a finger with an endpoint 304. For example, association may have already occurred during insertion step 504, where each endpoint 304a and 304b can be associated with respective finger that determined initial placement of that endpoint 304a or 304b. In other embodiments, association can be performed by tapping a finger on an associated handle 306, as described above. Of course, other ways to associate a finger with endpoint 304 can also be used.

In some embodiments, movement of endpoints 304a and 304b to new locations can be performed simultaneously by moving fingers associated with endpoints 304a and 304b at the same time, for example. In other embodiments, a first finger can be used to anchor (i.e., hold) a location of an endpoint 304 and a second finger can be used to scroll text (e.g., by flicking the second finger on the touch screen 200 or dragging scroll bar 310 illustrated in FIG. 4). The first finger can then be moved to a second location in the scrolled-to text, thereby moving endpoint 304 to the second location.

The above described features can provide various ways for quick and easy selection of text using a touch-sensitive display.

Referring back to FIG. 5, various editing functions can also be performed on the selected text in step 508. Such editing functions can include any conventional word processing, email, note pad, instant message, blogging or web browser editing functions, for example. Such functions can include copying and pasting the selected text, cutting and pasting the selected text, underlining the selected text, bolding the selected text, changing the font of the selected text, and the like.

Note that computer readable instructions implementing process 500, for example, can be stored and transported on any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any medium that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM) (magnetic), an optical fiber (optical), portable optical disc such a CD, CD-R, CD-RW, DVD, DVD-R, or DVD-RW, or flash memory such as compact flash cards, secured digital cards, USB memory devices, memory stick, etc. Note that the computer-readable medium could even be paper or another suitable medium upon which the program is printed, as the program text can be electronically captured via optical scanning of the paper or other medium, then compiled, interpreted or otherwise processed in a suitable manner if necessary, and then stored in a computer memory.

As used in this disclosure, the phrase moving "in accordance with" can refer to moving an object relative to another object or moving an object in proportion with another object, for example.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. For example, the features described herein need not be limited to placement and selection of text, as the teachings herein can also be used for placement and selection of other types of graphics, such as pictures, symbols, icons or the like. Moreover, the various implementations disclosed herein are not limited to use of touch-sensitive display, as a touch-sensitive panel that does not display output can also be used. Such a non-display touch-sensitive panel can extend from or be separately connected to a display and can be in the form of a touchpad or trackpad, for example. A display connected to such a non-display touch-sensitive panel can also be touch-sensitive, but need not be touch-sensitive. A touch-sensitive panel in some embodiments can be analogous to the multi-touch sensitive tablets described in the following U.S. Pat. Nos. 6,323,846 (Westerman et al.), 6,570,557 (Westerman et al.), and/or 6,677,932 (Westerman), and/or U.S. Patent Publication 2002/0015024A1, each of which is hereby incorporated by reference in its entirety.

The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method using an electronic device having a touch-sensitive display, comprising:
   displaying text on the touch-sensitive display;
   detecting a text selection initiation gesture
   in response to the detecting of the text selection initiation gesture, inserting a text selection area bounded by a first endpoint located in the text at a first location and a second endpoint in the text at a second location:
      when the first endpoint and the second endpoint are located within currently displayed text, displaying a first handle proximate to the first endpoint and a second handle proximate to the second endpoint; and when the first endpoint is located outside currently displayed text, displaying a ghost handle associated with the first endpoint, wherein the ghost handle is displayed in place of the first handle.

2. The method of claim 1, further comprising performing a word processing function on text located between the first endpoint and the second endpoint.

3. The method of claim 2, wherein the word processing function comprises one of copying or cutting the selected text.

4. The method of claim 1, further comprising simultaneously moving the first endpoint to a third location in the text and the second endpoint to a fourth location in the text.

5. The method of claim 4, wherein the simultaneously moving step comprises:
associating the first endpoint with a first finger detected on the touch-sensitive display;
associating the second endpoint with a second finger detected on the touch-sensitive display; and
detecting the first and second fingers simultaneously slide to the third and the fourth locations, respectively, on the touch-sensitive display.

6. A method using an electronic device having a touch-sensitive display, comprising:
displaying text on the touch-sensitive display;
detecting a text selection initiation gesture, the text selection initiation gesture including a first contact and a second contact detected on the touch-sensitive display;
determining whether the text selection initiation gesture includes concurrently detecting the first contact and the second contact on the touch-sensitive display at respective locations that correspond to a first paragraph or the text selection initiation gesture includes concurrently detecting the first contact at a location on the touch-sensitive display that corresponds to the first paragraph and the second contact at a location on the touch-sensitive display that corresponds to a second paragraph distinct from the first paragraph; and,
in response to the detecting of the text selection initiation gesture, inserting a text selection area bounded by a first endpoint located in the text at a first location and a second endpoint in the text at a second location, wherein:
in response to a determination that the text selection initiation gesture includes concurrently detecting the first contact and the second contact on the touch-sensitive display at respective locations that correspond to the first paragraph, the device automatically assigns the first location to the beginning of the first paragraph and the second location to the end of the first paragraph; and
in response to a determination that the text selection initiation gesture includes concurrently detecting the first contact at a location on the touch-sensitive display that corresponds to the first paragraph and the second contact at a location on the touch-sensitive display that corresponds to the second paragraph distinct from the first paragraph, the device automatically assigns the first location to a location in the first paragraph and the second location to a location in the second paragraph.

7. The method of claim 1, further comprising moving the second endpoint from the second location to a third location in the text by associating a detected finger with the second endpoint and detecting the finger slide across the touch-sensitive display proximate to the third location.

8. The method of claim 1, further comprising:
selecting the second endpoint;
while the second endpoint is selected, detecting a finger slide across the touch sensitive display; and
moving the second endpoint in accordance with the detected finger slide to a third location in the text.

9. The method of claim 8, wherein the finger slide is detected starting on a portion of the touch-sensitive display that is remote from the second location.

10. A method using an electronic device having a touch-sensitive display, comprising:
displaying text on the touch-sensitive display;
detecting a text selection initiation gesture;
in response to the detecting of the text selection initiation gesture, inserting a text selection area bounded by a first endpoint located in the text at a first location and a second endpoint in the text at a second location;
selecting the first endpoint;
while the first endpoint is selected, detecting a finger slide across the touch sensitive display, wherein the finger slide is detected starting on a portion of the touch-sensitive display that is remote from the first location;
moving the first endpoint in accordance with the detected finger slide to a third location in the text; and
displaying a ghost handle associated with the first endpoint, wherein the ghost handle is displayed in place of the first endpoint when the first endpoint is located outside currently displayed text.

11. An electronic device, comprising:
a touch-sensitive display;
one or more processors;
memory; and
one or more programs, wherein the one or more programs are stored in the memory and configured to be executed by the one or more processors, the one or more programs including instructions for:
displaying text on the touch-sensitive display;
detecting a text selection initiation gesture;
in response to the detecting of the text selection initiation gesture, inserting a text selection area bounded by a first endpoint located in the text at a first location and a second endpoint in the text at a second location:
when the first endpoint and the second endpoint are located within currently displayed text, displaying a first handle proximate to the first endpoint and a second handle proximate to the second endpoint; and
when the first endpoint is located outside currently displayed text, displaying a ghost handle associated with the first endpoint, wherein the ghost handle is displayed in place of the first handle.

12. The device of claim 11, further comprising instructions for:
selecting the second endpoint;
while the second endpoint is selected, detecting a finger slide across the touch sensitive display; and
moving the second endpoint in accordance with the detected finger slide to a third location in the text.

13. The device of claim 12, wherein the finger slide is detected starting on a portion of the touch-sensitive display that is remote from the second location.

14. The device of claim 11, further comprising instructions for simultaneously moving the first endpoint to a third location in the text and the second endpoint to a fourth location in the text.

15. The device of claim 14, wherein the instructions for simultaneously moving comprise instructions for:
- associating the first endpoint with a first finger detected on the touch-sensitive display;
- associating the second endpoint with a second finger detected on the touch-sensitive display; and
- detecting the first and second fingers simultaneously slide to the third and the fourth locations, respectively, on the touch-sensitive display.

16. The device of claim 11, including instructions for performing a word processing function on text located between the first endpoint and the second endpoint.

17. The device of claim 16, wherein the word processing function comprises one of copying or cutting the selected text.

18. A non-transitory computer readable storage medium storing one or more programs, the one or more programs comprising instructions, which when executed by an electronic device with a touch-sensitive display, cause the device to:
- display text on the touch-sensitive display;
- detect a text selection initiation gesture;
- in response to the detecting of the text selection initiation gesture, insert a text selection area bounded by a first endpoint located in the text at a first location and a second endpoint in the text at a second location:
  - when the first endpoint and the second endpoint are located within currently displayed text, display a first handle proximate to the first endpoint and a second handle proximate to the second endpoint; and
  - when the first endpoint is located outside currently displayed text, display a ghost handle associated with the first endpoint, wherein the ghost handle is displayed in place of the first handle.

19. The computer readable storage medium of claim 18, including instructions that cause the device to:
- select the second endpoint;
- while the second endpoint is selected, detect a finger slide across the touch sensitive display; and
- move the second endpoint in accordance with the detected finger slide to a third location in the text.

20. The computer readable storage medium of claim 19, wherein the finger slide is detected starting on a portion of the touch-sensitive display that is remote from the second location.

21. The computer readable storage medium of claim 18, including instructions that cause the device to simultaneously move the first endpoint to a third location in the text and the second endpoint to a fourth location in the text.

22. The computer readable storage medium of claim 21, wherein the instructions for simultaneously moving comprise instructions that cause the device to:
- associate the first endpoint with a first finger detected on the touch-sensitive display;
- associate the second endpoint with a second finger detected on the touch-sensitive display; and
- detect the first and second fingers simultaneously slide to the third and the fourth locations, respectively, on the touch-sensitive display.

23. The computer readable storage medium of claim 18, including instructions that cause the device to perform a word processing function on text located between the first endpoint and the second endpoint.

24. The computer readable storage medium of claim 23, wherein the word processing function comprises one of copying or cutting the selected text.

25. An electronic device, comprising:
- a touch-sensitive display;
- one or more processors;
- memory; and
- one or more programs, wherein the one or more programs are stored in the memory and configured to be executed by the one or more processors, the one or more programs including instructions for:
  - displaying text on the touch-sensitive display;
  - detecting a text selection initiation gesture, the text selection initiation gesture including a first contact and a second contact detected on the touch-sensitive display;
  - determining whether the text selection initiation gesture includes concurrently detecting the first contact and the second contact on the touch-sensitive display at respective locations that correspond to a first paragraph or the text selection initiation gesture includes concurrently detecting the first contact at a location on the touch-sensitive display that corresponds to the first paragraph and the second contact at a location on the touch-sensitive display that corresponds to a second paragraph distinct from the first paragraph; and,
  - in response to the detecting of the text selection initiation gesture, inserting a text selection area bounded by a first endpoint located in the text at a first location and a second endpoint in the text at a second location, wherein:
    - in response to a determination that the text selection initiation gesture includes concurrently detecting the first contact and the second contact on the touch-sensitive display at respective locations that correspond to the first paragraph, the device automatically assigns the first location to the beginning of the first paragraph and the second location to the end of the first paragraph; and
    - in response to a determination that the text selection initiation gesture includes concurrently detecting the first contact at a location on the touch-sensitive display that corresponds to the first paragraph and the second contact at a location on the touch-sensitive display that corresponds to the second paragraph distinct from the first paragraph, the device automatically assigns the first location to a location in the first paragraph and the second location to a location in the second paragraph.

26. A non-transitory computer readable storage medium storing one or more programs, the one or more programs comprising instructions, which when executed by an electronic device with a touch-sensitive display, cause the device to:
- display text on the touch-sensitive display;
- detect a text selection initiation gesture, the text selection initiation gesture including a first contact and a second contact detected on the touch-sensitive display;
- determine whether the text selection initiation gesture includes concurrently detecting the first contact and the second contact on the touch-sensitive display at respective locations that correspond to a first paragraph or the text selection initiation gesture includes concurrently detecting the first contact at a location on the touch-sensitive display that corresponds to the first paragraph and the second contact at a location on the touch-sensitive display that corresponds to a second paragraph distinct from the first paragraph; and,
- in response to the detecting of the text selection initiation gesture, insert a text selection area bounded by a first endpoint located in the text at a first location and a second endpoint in the text at a second location, wherein:

in response to a determination that the text selection initiation gesture includes concurrently detecting the first contact and the second contact on the touch-sensitive display at respective locations that correspond to the first paragraph, the device automatically assigns the first location to the beginning of the first paragraph and the second location to the end of the first paragraph; and in response to a determination that the text selection initiation gesture includes concurrently detecting the first contact at a location on the touch-sensitive display that corresponds to the first paragraph and the second contact at a location on the touch-sensitive display that corresponds to the second paragraph distinct from the first paragraph, the device automatically assigns the first location to a location in the first paragraph and the second location to a location in the second paragraph.

27. An electronic device, comprising:

a touch-sensitive display;

one or more processors;

memory; and one or more programs, wherein the one or more programs are stored in the memory and configured to be executed by the one or more processors, the one or more programs including instructions for:

displaying text on the touch-sensitive display;

detecting a text selection initiation gesture;

in response to the detecting of the text selection initiation gesture, inserting a text selection area bounded by a first endpoint located in the text at a first location and a second endpoint in the text at a second location;

selecting the first endpoint;

while the first endpoint is selected, detecting a finger slide across the touch sensitive display, wherein the finger slide is detected starting on a portion of the touch-sensitive display that is remote from the first location;

moving the first endpoint in accordance with the detected finger slide to a third location in the text; and displaying a ghost handle associated with the first endpoint, wherein the ghost handle is displayed in place of the first endpoint when the first endpoint is located outside currently displayed text.

28. A non-transitory computer readable storage medium storing one or more programs, the one or more programs comprising instructions, which when executed by an electronic device with a touch-sensitive display, cause the device to:

display text on the touch-sensitive display;

detect a text selection initiation gesture;

in response to the detecting of the text selection initiation gesture, insert a text selection area bounded by a first endpoint located in the text at a first location and a second endpoint in the text at a second location;

select the first endpoint;

while the first endpoint is selected, detect a finger slide across the touch sensitive display, wherein the finger slide is detected starting on a portion of the touch-sensitive display that is remote from the first location;

move the first endpoint in accordance with the detected finger slide to a third location in the text; and display a ghost handle associated with the first endpoint, wherein the ghost handle is displayed in place of the first endpoint when the first endpoint is located outside currently displayed text.

* * * * *

UNITED STATES PATENT AND TRADEMARK OFFICE
CERTIFICATE OF CORRECTION

PATENT NO. : 8,650,507 B2  
APPLICATION NO. : 12/042313  
DATED : February 11, 2014  
INVENTOR(S) : Wayne Carl Westerman et al.

Page 1 of 1

It is certified that error appears in the above-identified patent and that said Letters Patent is hereby corrected as shown below:

On the Title Page

Item (57), under "ABSTRACT", in column 2, line 12, Delete "on the on the" and insert -- on the --, therefor.

On page 3, Item (56), under "OTHER PUBLICATIONS", in column 2, line 43, Delete "Appliction" and insert -- Application --, therefor.

On page 4, Item (56), under "OTHER PUBLICATIONS", in column 1, line 54, Delete "Appl.n" and insert -- Appl. --, therefor.

On page 4, Item (56), under "OTHER PUBLICATIONS", in column 2, line 14, Delete "Applicatoin" and insert -- Application --, therefor.

On page 4, Item (56), under "OTHER PUBLICATIONS", in column 2, line 14, Delete "s stems," and insert -- systems, --, therefor.

Signed and Sealed this  
Seventh Day of April, 2015

Michelle K. Lee  
*Director of the United States Patent and Trademark Office*